United States Patent

Baer

[11] Patent Number: 6,149,806
[45] Date of Patent: Nov. 21, 2000

[54] TWO PIECE FRAME AND TWO PIECE DIAPHRAGM FILTER PLATE

[76] Inventor: William Baer, 750 Easy St., Simi Valley, Calif. 93065-1810

[21] Appl. No.: 09/290,280

[22] Filed: Apr. 13, 1999

Related U.S. Application Data

[60] Continuation-in-part of application No. 08/856,310, May 14, 1997, abandoned, which is a division of application No. 08/440,104, May 12, 1995, Pat. No. 5,672,272.

[51] Int. Cl.⁷ .................................................. B01D 25/168
[52] U.S. Cl. ........................... 210/231; 210/350; 100/211
[58] Field of Search ..................... 210/224, 225, 210/227, 230, 231, 350, 770; 100/211

[56] References Cited

U.S. PATENT DOCUMENTS

| | | | |
|---|---|---|---|
| 3,503,326 | 3/1970 | Juhasz et al. | 210/225 |
| 3,807,298 | 4/1974 | Luke et al. | 210/225 |
| 4,565,637 | 1/1986 | Pearce | 210/350 |
| 4,781,829 | 11/1988 | Stanik | 210/231 |

FOREIGN PATENT DOCUMENTS

| | | | |
|---|---|---|---|
| 2720904 | 11/1978 | Germany | 210/231 |
| 2110104 | 6/1983 | United Kingdom | 210/231 |

*Primary Examiner*—Matthew O. Savage

[57] ABSTRACT

The present invention is a two piece frame embodiment in which a novel diaphragm inflation assembly and method are provided. Primary pieces include a two piece frame, two diaphragm pieces and two filter cloths integral with rubber gasketing. The two piece frame defines substantial voids to reduce weight, the two pieces comprising mirror image pieces. The intent of this embodiment is to reduce the weight, and therefore material and handling effort, of the prior art filter plates.

15 Claims, 12 Drawing Sheets

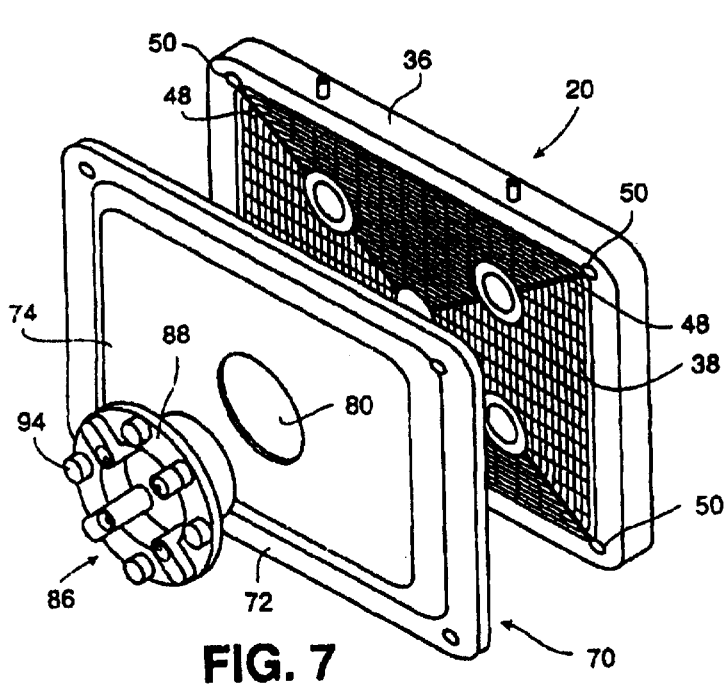
FIG. 7
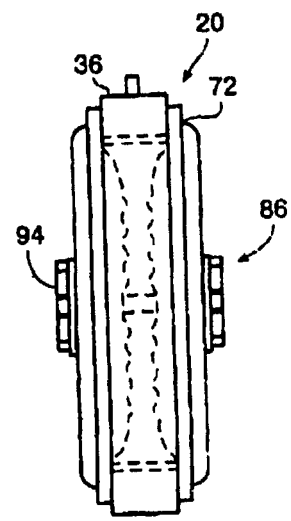
FIG. 8
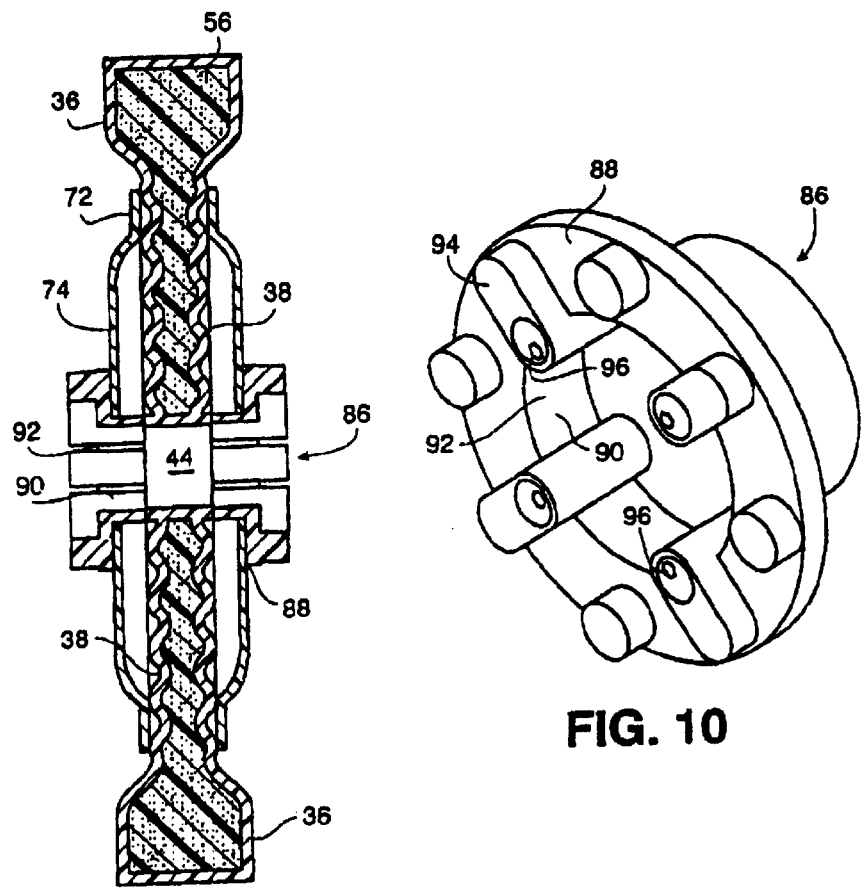
FIG. 9
FIG. 10

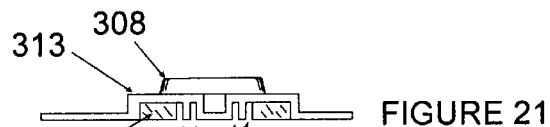
FIGURE 21
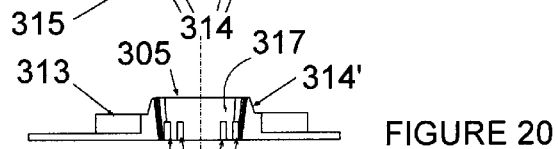
FIGURE 20
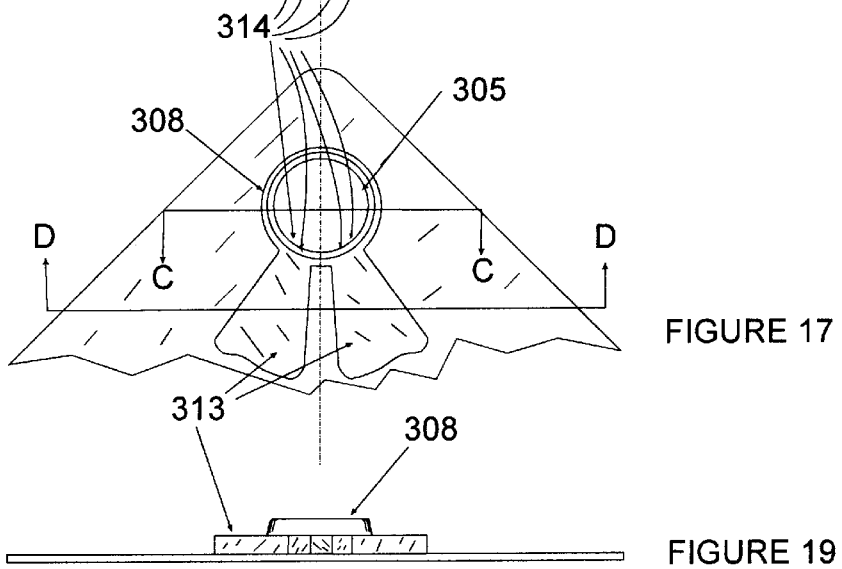
FIGURE 17
FIGURE 19
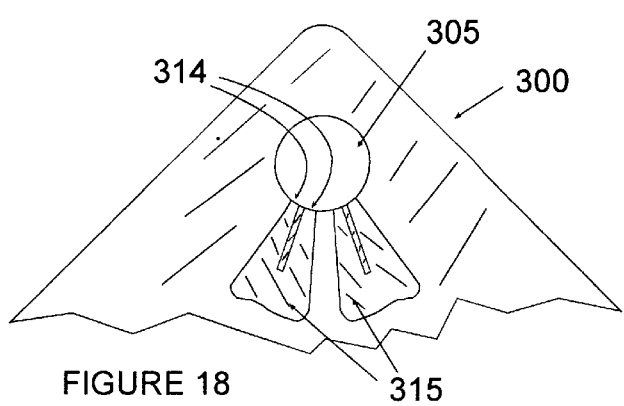
FIGURE 18
FIGURE 22
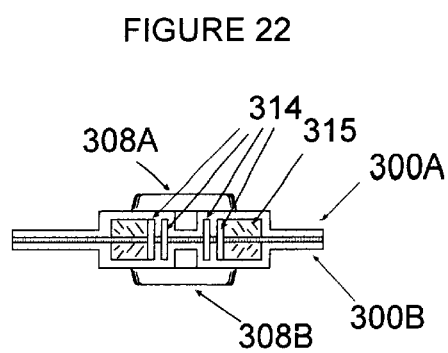

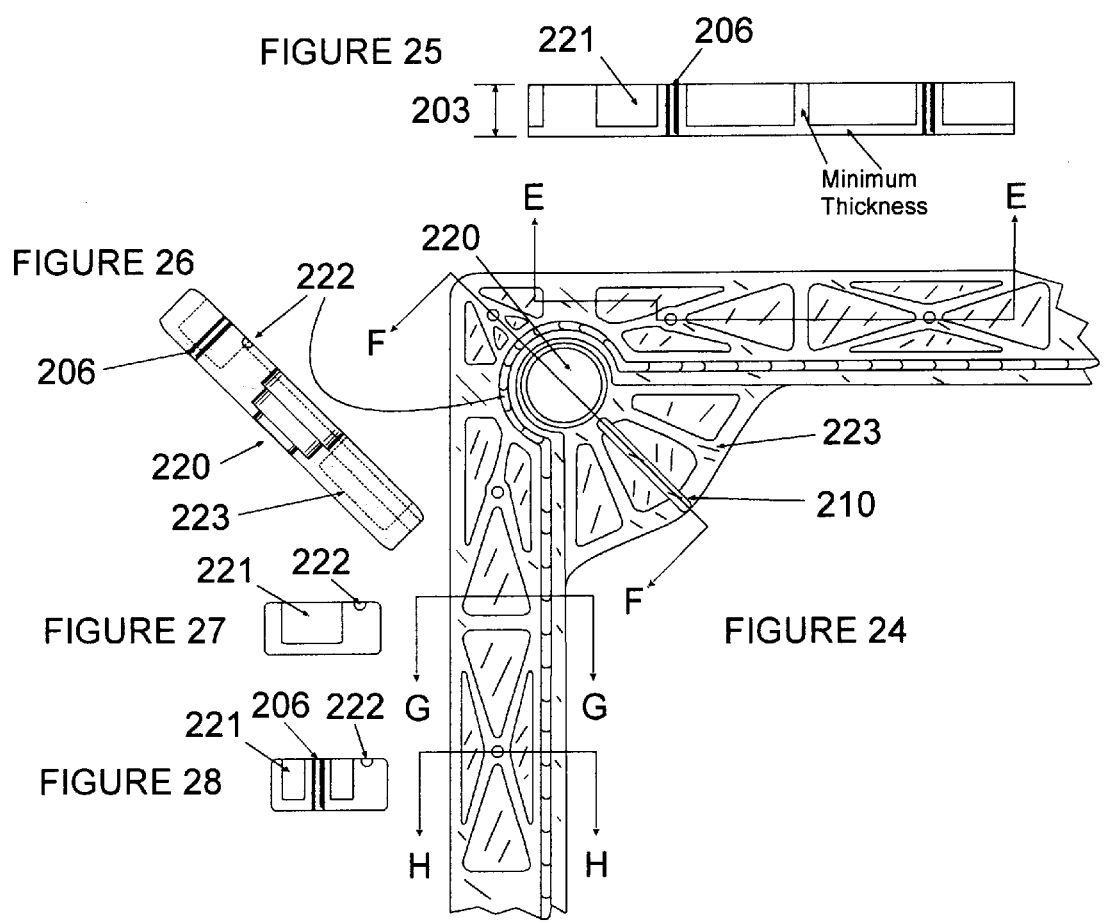

TWO PIECE FRAME AND TWO PIECE DIAPHRAGM FILTER PLATE

This application is a continuation in part of application Ser. No. 08/856310, filed May 14, 1997, now abandoned, which is a division of application Ser. No. 08/440104, filed May 12, 1995, issued Sep. 30, 1997 as U.S. Pat. No. 5,672,272.

BACKGROUND OF THE INVENTION

This invention relates in general to certain new and useful improvements in filter plates of the type used in filter presses, and more particularly, to a filter plate which is constructed of a frame and integral expandable plate forming walls or skins with an interior core capable of being expanded upon the introduction of an expanding fluid therein and which also provides excellent heat transfer characteristics, as well as accessories for such plates.

Liquid-solid separation has, for many years, been an integral part of processes in many industries and primarily the chemical industry where it is often necessary to separate liquids from solids for purposes of reclaiming either the solids or the liquids, or both. Liquid-solid separation is also involved in numerous other industries as, for example, the food industry where the edible food product is oftentimes recovered from a liquid containing slurry, and waste management where it is necessary to dispose of the solid waste material and possibly reclaim or recycle the liquid.

One of the principal-devices for causing liquid-solid separation is a filter press and these filter presses conventionally use a plurality of marginally registered stacked filter plates. Each of the filter plates comprise a plate structure having a filter membrane or so-called "screen" disposed across the plate. The filter plates are held in tight engagement with one another in a stacked arrangement to enable the liquid to be passed through the filter or screen and allowing the solid or solids to form on the screen as a cake.

Numerous filter plate designs are available in the prior art. Each of these filter plates have a main peripheral frame with a central plate structure extending across the frame. A separate filter or screen is placed on each of the sides of the frame. The liquid slurry containing the solid is then pumped through the filter plates and brought into contact with the screens, usually under pressure. The solid material in the slurry forms as a cake on the exterior sides of the screens allowing the liquid to pass through the screens and into a duct network connected to the filter plates and delivered to a collection area.

One of the major drawbacks of the type of filter plates heretofore described is that in the absence of some type of plate expansion, the water extraction process is relatively slow. Thus, separation of liquid from water, depending upon the type of materials involved, can take many hours. This necessarily slows down an entire process or otherwise, requires the provision of a large number of filter presses.

Each of the conventional filter plates usually employ a filter screen having a pair of filter sheets or so-called "screens" with one on each of the opposite sides of the plate. The filter plate is provided with a central feed opening and the screen, which is usually in the form of a fabric gauze material, is stuffed through the hole so that the sheet can open on each of the opposite sides of the plate. However, this construction necessarily limits the plate to a single screen and furthermore, to a single feed duct.

There have also been many commercially available diaphragm plates which are available in the prior art. These diaphragm plates are typically constructed of a relatively rigid frame member, such as a rectangular frame, and have elastomer sheets connected to each of the sides of the frame on the exterior thereof in order to form a type of plate structure. The elastomer sheets are expandable outwardly so that when a fluid is introduced into the plate, a pressure will build up behind the elastomer sheets causing the elastomer sheets to expand.

In the conventional filter press, a pair of plates lie in juxtaposed arrangement with respect to one another and hence, the screens on those plates lie in juxtaposed arrangement. The slurry is introduced into the cavity between the two screens and when the elastomer sheets expand against the slurry captured between two plates this forces a greater separation of the liquid-solid slurry.

These diaphragm plates have several disadvantages. First of all, the diaphragm plate has little heat transfer capability. Consequently, it is difficult, if not virtually impossible, to control the temperature of the slurry which may be desirable, if not absolutely necessary in many chemical process operations. Equally disadvantageous is the fact that the elastomer membrane is secured within a groove formed in the interior of the frame.

However, this structure is not capable of withstanding any significant pressure if the diaphragm plate is inadvertently expanded when not in the confines of a press. Consequently, the elastomer will literally blow out of the frame itself, thereby totally destroying the frame.

If several frames are located in a press and adequate pressure is not applied to the frames before an expansion process begins, then several plates could all simultaneously be destroyed. These plates are quite expensive and therefore, destruction of the plates can be cost prohibitive and materially add to the overall cost of the process.

There has been a need. for a filter plate which provides excellent heat transfer characteristics and does not suffer the problems of a potentially rupturing diaphragm and which still maintains excellent structural integrity with expansion characteristics. There has also been a need for a filter plate having a screen which can be easily replaced and which can be readily reused.

SUMMARY OF THE INVENTION

Some of the major objectives of this present invention are to therefore overcome many of the problems inherent in prior art filter plates and in prior art filter screens used in connection with filter plates, as well as to overcome other problems associated therewith.

It is therefore one of the primary objects of the present invention to provide a filter plate construction which has, excellent structural integrity and which is capable of having plate or skin expansion and contraction to aid in liquid-solid separation.

It is another object of the present invention to provide a filter plate construction of the type stated which has excellent heat transfer characteristics and enables temperature control of a slurry during a separation operation.

It is a further object of the present invention to provide a filter plate construction of the type stated which has a plurality of feed inlets thereby improving the overall efficiency of operation of the filter plate.

It is an additional object of the present invention to provide a filter plate construction which can be easily and inexpensively made in a rotational molding operation.

It is also an object of the present invention to provide a filter plate construction of the type stated which can be manufactured at a relatively low cost, but which is highly efficient in operation and has excellent longevity.

It is another salient object of the present invention to provide a filter plate construction in which a pair of separate screens can be clamped to each of the opposite sides thereof.

It is still another object of the present invention to provide a filter screen which can be made as a relatively unitary structure and which does not suffer layer delamination extant in many prior art filter screens.

It is yet a further object of the present invention to provide a unique method of making a filter screen in a single molding operation.

It is still an additional object of the present invention to provide a method of separating a solid and liquid from a slurry in a filter operation while maintaining excellent heat transfer characteristics.

With the above and other objects in view, my invention resides in the novel features of form, construction, arrangement and combination of parts presently described and pointed out in the claims.

The present invention relates in general to filter plates and filters used therewith, typically in filter press arrangements. The present invention provides, in a preferred aspect, several embodiments of a unique filter plate construction, as well as a unique filter, or so-called "filter screen", used therewith.

The filter plate of the present invention is used in filter presses to affect liquid-solid separation. The filter plate is constructed so as to allow expansion in order to facilitate liquid solid separation. The filter screen of the invention becomes an important part of the assembly with that filter plate.

The filter plate comprises a main peripherally extending continuous frame having a hollow interior and which is preferably plastic molded and even more preferably rotationally molded. The frame would normally be opened in a central portion, but is provided with a pair of spaced-apart plastic skins which extend entirely across the opened portion of the frame and form an interior space therebetween. This interior space is in communication with the interior of the frame.

A solid core foam material is introduced into and substantially fills the space between the pair of skins and also the central hollow interior of the peripherally extending frame. It has been found in connection with the present invention that the foam core does not laminate to the skins. This permits expansion of the skins when a fluid is introduced into the hollow interior of the frame and the space located between the skins. The introduction of an expanding fluid imposes an additional pressure against the slurry and facilitates liquid-solid separation. In this respect, a fitting may be literally molded into the frame during the formation of the frame to enable introduction of the fluid into the hollow interior of the frame and the space between the skins. In like manner, other fittings, such as liquid drainage fittings and the like, may also be molded directly in to the skins or the frame, or both.

In a preferred embodiment, the skins in the filter plate are preferably integral with the frame and become integral during the holding operation, such as the rotational molding operation. Moreover, the skins have a type of convoluted surface construction which facilitates the expanding of the skins. Thus, the skins have an excess material taken up by ridges and valleys between the ridges in a type of accordion process which permits expansion as the skins are forced outwardly under an expanding fluid. Further, the skins are provided with additional liquid drainage channels formed with the convolutions and on the outer surface of the skins to permit liquid drainage.

In another embodiment of the invention, the filter plate assembly is provided with an improved means for mounting a filter thereto. The filter plate is again provided with a continuous peripheral frame having at least one skin, and preferably a pair of skins, extending across the open portion of the frame. A filter is located against the skin and receives a slurry on the exterior face thereof. When the filter plate is locked into a position with a plurality of other filter plates on each of the opposite sides thereof, a cavity is formed between the filter screens of a pair of adjacent filter plates. A feed slurry is introduced through a feed aperture in the filter plate into the individual cavities. Liquid separation occurs by passage of the liquid through the filter screen and permits drainage of the liquid leaving the formation of the solid as a cake on the exterior face of the screens.

The filter screen of this invention is provided with a frame having a central opening and a filter material, such as a filter screen, extending across this opening and lying in juxtaposition to the skin of the frame. The filter material also has an aperture alienable with a main aperture in the skin.

A retaining adapter is provided with the filter plate for holding the filter screen to the filter plate and then three components constitute a filter plate assembly. This retaining adapter is provided with a hub, such as a cylindrically-shaped hub, extendable through the apertures in the filter plate and in the skin. An enlarged flange is secured to and extends around an end of the hub. This flange engages the filter material and holds the filter onto the filter plate. Means can be further provided for releasibly holding the filter to the filter plate as, for example, fasteners and the like.

In a more preferred embodiment, the filter plate assembly has a pair of skins which extend across the opposite sides of the frame, as aforesaid. The second skin is also provided with a central aperture and which is alienable with a like central aperture in a second filter. Further, a second retaining adapter, substantially identical in construction to the first named retaining adapter, is provided for holding the second filter against the second skin of the filter plate.

In a more preferred embodiment, the retaining adapters used with the assembly of the invention, are provided with central ducts which carry the slurry to a side of the filter away from the skin to which the filter is juxtaposed. Thus, the feed slurry is introduced through the apertures of each of the aligned filters and filter plates and the liquid is drained away by means of drainage channels in the filter plate connected to drainage tubes or drainage ducts.

In a more preferred embodiment of the invention, the filter plate is provided with a plurality of feed apertures in the plate in order to receive the feed slurry simultaneously at different points on the plate. A separate filter is secured to the plate at each of these feed apertures. These filters, in combination, cover substantially all of the surface area of the skins of the filter plate. Moreover, each of these filters are mounted to the plate in the same manner as previously described. This construction enables a plurality of feed ducts to be provided to each individual filter, since it is now possible to avoid the type of sewn filter which must be inserted through a feed opening and then opened on each of the opposite sides thereof.

In another embodiment of the invention, an improved filter screen device of the type used with filter plates in a filter press is also provided. This filter screen device comprises a filter medium which may be in the form of a cloth or screen and has a porosity sufficient to allow liquid of a slurry to pass therethrough and collect a solid of that slurry on the surface of the filter medium. An outer peripheral surrounding rim formed of an elastomer material is secured to the filter medium. In this case, the filter medium, such as the screen, is molded into the rim in order to form a unitary structure.

In a preferred embodiment, the screen is formed of a nonelastomeric material. The screen is located in the central opening of the rim and the screen has an outer peripheral edge located at and molded into the inner peripheral edge of flanges on said rim extending into the opening. In this way, the screen truly becomes an integral structure with the surrounding elastomeric material.

The screen is also provided with an aperture extending therethrough in order to receive a retaining adapter of the type previously described. This retaining adapter is effective to mount the filter screen apparatus to the filter plate.

The present invention also provides a method of separating a solid and a liquid from a slurry in a filter press comprised of individual filter plates. The method comprises locating a filter screen against a skin of a filter plate having a surrounding peripheral frame and a skin extending across the frame. The method further involves the aligning of an aperture in the filter screen with a like alienable aperture in the skin of the filter plate. Thereafter, a hub forming part of a retaining adapter is inserted into aligned apertures in the filter screen and the filter plate. Thereafter, the retaining adapter is effectively clamped to the screen and to the plate.

This invention possesses many other advantages and has other purposes which will be made more fully apparent from a consideration of the forms in which it may be embodied. Some of the forms of the filter plate, and the accessories, and for that matter, the associated methods, is more fully described in the following description, and more fully illustrated in the accompanying drawings. However, it is to be understood that these drawings and the following detailed description are, set forth for purposes of illustrating and describing the general principles of the invention and are not to be taken in a limiting sense.

In improving over the devices of the prior application Ser. No. 09/xxx,xxx, the present invention comprises a two piece frame securing therebetween the edges of two opposing and mutually supporting diaphragm skins, whereby the frame pieces also secure the rubber reinforced edges of two filter cloths, the filter cloths sandwiching the two diaphragm skins. The novel assembly of frame, skins and filter cloths eliminate the need for any additional support between the inner faces of the skins. The skins are inflatable such that the outer faces of the skins are capable of very high pressure compression of filter cakes accumulating between the filter cloths of opposing assemblies according to the improvement of the present invention.

The following describes a two piece frame embodiment of the present invention, in which a novel diaphragm inflation assembly and method are provided. Primary pieces include a two piece frame, two diaphragm pieces and two filter cloths integral with rubber gasketing. The two piece frame defines substantial voids to reduce weight, the two pieces comprising mirror image pieces. The intent of this embodiment is to reduce the weight, and therefore material and handling effort, of the prior art filter plates.

It has been a consistent teaching in the prior art that the "frame" region generally defines the outer edges of filter plate and must be integrally connected to a support plate or strut framework reaching all inner edges of the "frame" to support the frame and keep it from becoming distorted or misaligned from its typically rectangular shape. This retention of uniform rectangular shape is a critical feature of filter plates since usually four or more such filter plates must be pressed together in substantially precise alignment as shown in FIG. 1. The prior art discloses diaphragms that may be used with filter cloths, the diaphragms being arranged between the support plate or strut framework and the filter cloths. It has not been previously contemplated to provide a diaphragm, as in the present embodiment, which entirely replaces and performs fully the function of the support plate or strut framework and in addition performs the inflation and deflation necessary for filter cake compression.

Another critical aspect of the function of filter plates is the requirement for additional plate to plate support within the intra-frame region occupied by the support plate or strut framework of the devices of the prior art. From the planar support element of the support plate or the strut framework arises normal to that plane a typically cylindrical extension arises to oppose a similar cylindrical extension of the adjacent filter plate. When the several filter plates are in the filter press, the cylindrical extensions provide longitudinal (with respect to the filter press) support against the collapse of the support plate or strut framework upon the several types of fluid surging motion required in filter press operation. Larger size filter plates (in excess of a diagonal frame measurement of about 24 inches) may require the addition of such cylindrical extensions or their functional equivalent. The present embodiment, in furthering its ability to completely replace the support plate or strut framework of the prior art, provides for that same longitudinal support on the diaphragm pieces by forming an adjacent plate-opposing, although comprising mostly void space, raised section. The filter cloth is preferably reinforced with a rubber layer so that the inflation and deflation actions of the diaphragm do not form holes in the filter cloth by abrasion.

With the described exceptions thereto, each diaphragm comprises a generally planar rectangular planar piece extending to approximately the same outer edge dimensions as the outer edges of the two frame pieces, thereby providing for fluid tight diaphragm sealing (except for fluid inlet/outlet ports at frame corner feed conduits) when the two frame pieces are bolted or screwed together. For an "active" area of the diaphragm faces, both the outer, adjacent plate-opposing face and the inner, same filter plate diaphragm-opposing face, comprise a multitude of solid raised lugs. The non-"active" area of the diaphragm faces is the area of the outer and inner faces to be secured between the two frame pieces and are flat to accomplish that end.

Most importantly to accomplish the dual role as support plate and diaphragm, the cross section of the "active" area of the diaphragm comprises a generally wave shape having crests and troughs. The combination in the present embodiment of an adequate diaphragm thickness in a wave shape for both diaphragm inflation and deflation and lateral support to the frame and longitudinal (as to the filter press) support to the adjacent plates has not heretofore been disclosed or contemplated in the prior art. The lugs of the outer face of the diaphragm piece extend from both the crests and troughs of that side and are situated normal to the crest or trough from which they extend. The outer face lugs support the filter cloth away from the smooth surface of the outer face so that pressurized liquid, steam and vacuum filtration may be accomplished without pressing or drawing to the smooth surface the filter cloth, thereby blocking a fluid drainage from the process inlet ports through the filter cake to the process outlet ports.

The diaphragm pieces of a single filter plate are, as the two frame pieces, mirror images of each other. Thus, the lugs of the inner face of one diaphragm piece of a single filter plate are arranged on the crests of that side, i.e., the troughs of the outer face, in a manner to oppose the lugs on the crests of the inner face of the other diaphragm piece of the same filter plate. When the diaphragm is deflated, the smooth surfaces of the inner face do not collapse toward each other, but instead are held apart to promote lateral support of the diaphragm pieces, where such lateral support was previously provided in the prior art by support plates or strut frameworks.

Thus, the two diaphragm pieces, secured between the lightweight frames, providing sufficiently rigid lateral support to the frame, provide longitudinal (as to the filter press) support in the form of the raised sections opposing one another as to the outer faces of adjacent filter plates as well as the opposing lugs of the inner faces of the diaphragm pieces of the same filter plate. This unique support system is accomplished without any additional support plates or strut framework. The diaphragms of the present embodiment are no longer the diaphanous rubber bladders of the prior art that wear out with continuous use through their abrasion with the filter cloth and sediment of the filter cake. The diaphragms of the present embodiment are no longer simply another replacement piece that must be separately formed and installed like the filter cloth. The diaphragms of the present embodiment are so strong that they provide all the lateral support needed for the lightweight frames of the present embodiment. The diaphragm pieces of the present embodiment are preferably formed of a sufficiently flowable, flexible and tough polymer as may accomplish the objects of the present invention. The polymer of the specific example below may be certain types of polyolefins, such as polyethylene, polypropylene and the like, as well as some types of PET and similar polymers providing the desired structural requirements as well as low reactivity with filter process components.

Each corner of the filter plate of the present embodiment may comprise, with adaptation of only a portion of the diaphragm pieces, either a process inlet/outlet port or diaphragm fluid inlet/outlet port. Each corner of the frame pieces of the filter plate comprises a rather large diameter hole which, when aligned with other such holes in adjacent filter plates, form a conduit through which may pass process fluids or diaphragm inflation/deflation or heat transfer fluids, and therefrom to the just described ports for feeding or withdrawal from the appropriate section, i.e., to the diaphragm inflation space or one side or the other of the filter cloth. At one end, the process fluid or diaphragm fluid conduit is sealingly attached to a pressure fluid supply or fluid drain, thereby providing means for supplying to or draining from cavities in fluid connection with the conduit a diaphragm inflation fluid or diaphragm heat transfer fluid. The fluid may be pumped from the conduit into a diaphragm inflation space between the opposing inner faces of the skins.

BRIEF DESCRIPTION OF THE DRAWINGS

FIG. 7 is an exploded perspective view showing the attachment of a filter screen to a filter plate in accordance with the present invention.

FIG. 8 is a side elevational view of the filter plate and filter screen arrangement.

FIG. 9 is an enlarged fragmentary sectional view showing the attachment of the filter screen to a filter plate in accordance with the present invention.

FIG. 10 is a perspective view of one form of retaining adapter used in accordance with the present invention.

FIGS. 17, 18 and 19 are a broken away corner of, respectively, the outer and inner faces and edge view of the diaphragm piece of FIG. 15, such corner providing means to seal the diaphragm piece to the frame such that diaphragm fluid flows only to the diaphragm inflation/deflation ports and not to the process side of the filter plate in operation.

FIGS. 20 and 21 are cross section views of FIG. 17.

FIG. 22 is an assembled view of the cross sections of FIG. 21, whereby two opposing diaphragm pieces are shown opposing one another and forming both sealing means to the two frame pieces between which they will be compressed and two diaphragm fluid inlet/outlet ports.

FIGS. 23, 24 and 29 are broken away bottom views of identical corners of each of the frame pieces of FIG. 14.

FIGS. 25–28 and 30 are, respectively, cross sections EE, FF, GG, HH and JJ of FIGS. 23, 24 and 29.

DETAILED DESCRIPTION OF PREFERRED EMBODIMENTS

Figure 1:
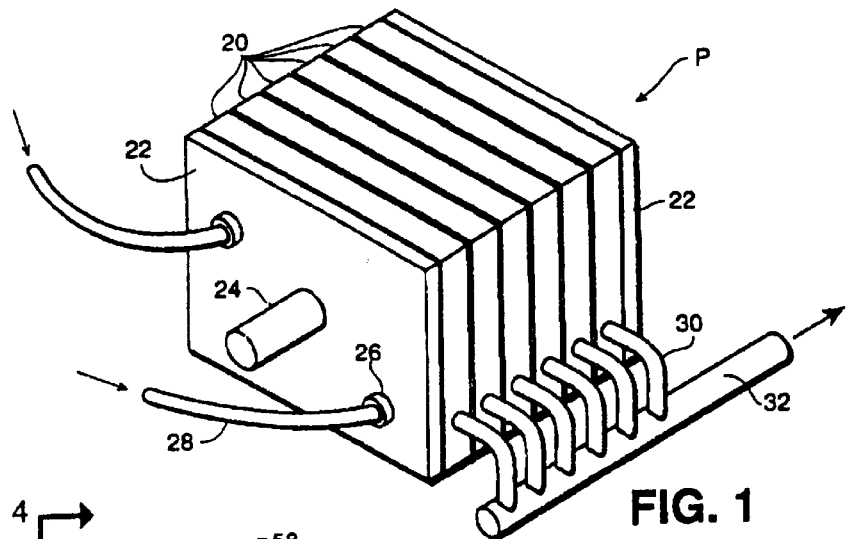
FIG. 1 is a perspective view of a plurality of filter plates of the present invention connected together in a filter press arrangement.

Referring now in more detail and by reference characters to the drawings which illustrate several practical embodiments of the present invention, P designates a filter press arrangement comprised of a plurality of stacked and marginally registered filter plates 20 and which are captured between and held in pressed engagement with one another by means of metal end blocks 22. The end plates 22, and often referred to as "press plates", are forced toward one another and thereby clamp the filter plates 20 into tight engagement with one another by means of external force applying devices, not shown, but operating upon shafts 24. The shafts 24 are typically part of a hydraulic ram, or other form of pneumatic ram, which forces the end plates 22 toward one another. However, other means of providing a clamping force between the two end plates 22, such as, for example, rotatable screw shafts or the like could be used.

In the embodiment of the invention as shown in FIG. 1, a pair of inlet feeds 26 are shown in one of the end plates 22 and respectively receive slurry delivery tubes 28. These delivery tubes 28 are connected to a source of a slurry containing solids entrained in or carried by a liquid and which are introduced to the respective plates, in a manner as hereinafter described in more detail. Moreover, each of the filter plates are provided with liquid drainage channels (also hereinafter described in more detail) which are connected to individual liquid extraction or drainage tubes 30, in turn, connected to a common drainage or recaptured liquid duct 32.

Figure 2:
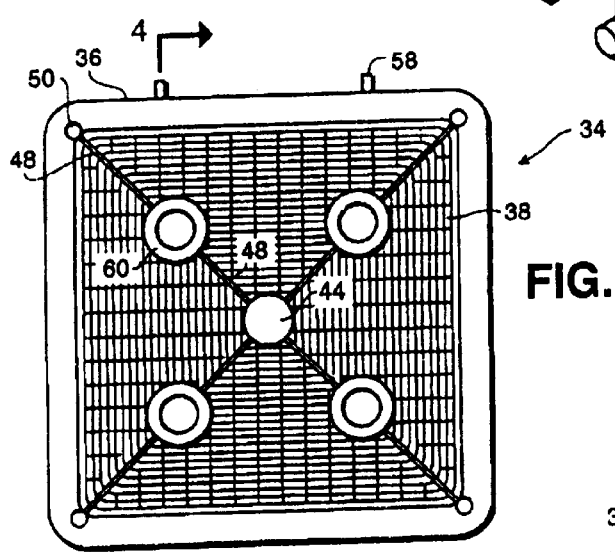
FIG. 2 is a perspective view of one of the filter plates of the present invention.
Figure 3:
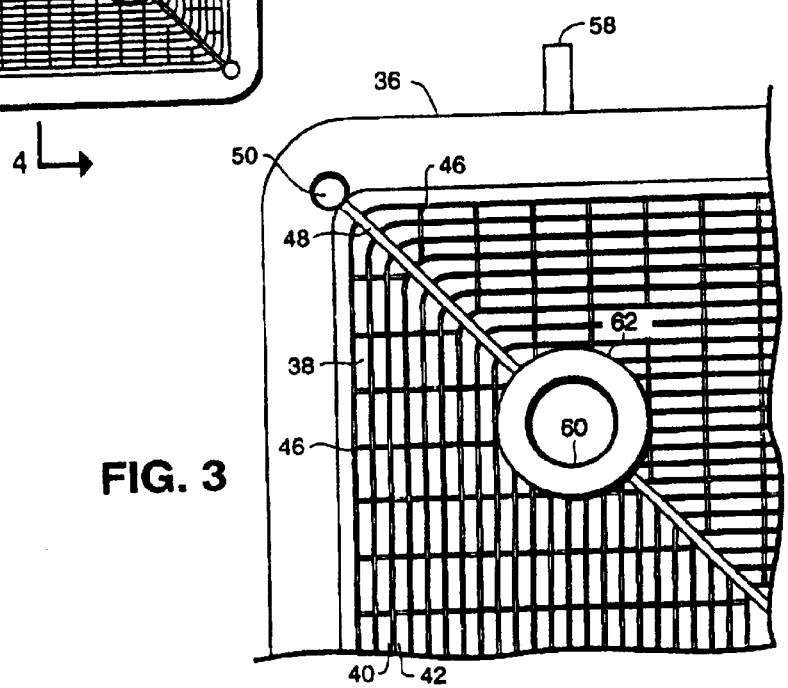
FIG. 3 is an enlarged fragmentary elevational view of a portion of the filter plate of FIG. 2 and showing the convoluted surface thereof.
Figure 4:
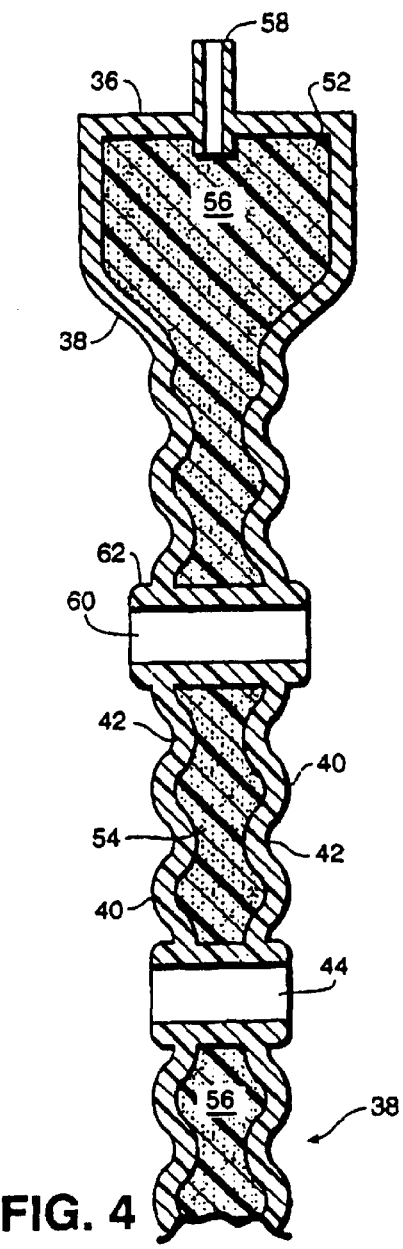
FIG. 4 is a fragmentary vertical sectional view taken along line 4—4 of FIG. 2.

FIGS. 2–4 illustrate one form of filter plate 34 which is constructed in accordance with the present invention and is preferably molded such as, for example, by injection molding, from a suitable plastic, e.g., polypropylene, or the like. The plates, however, could be formed of any of a known number of moldable plastics, such as high density polyethylene, polybutadiene, etc. For that matter, the plates could be formed of other materials such as, for example, structural metals or the like.

Each filter plate 34 is comprised of a peripherally extending rectangularly shaped frame 36 which is preferably rectangular in shape. The central portion of the frame 36, that is, the portion surrounded by the frame 36, would otherwise be opened, except for a pair of integrally formed skins 38 which extend across the frame, as best shown in FIGS. 2–4 of the drawings. As shown in FIG. 4, each of the skins 38 are integral with the frame 36. This results from the fact that the entire filter plate is molded as an integral structure. However, it should be understood that the skins could be individually formed apart from the frame and thereafter attached to the frame. However, the integral construction of the skins and the frame is preferred, due to the added integrity and rigidness of the structural connection between the skins and the frame.

Each of the skins 38 are undulating and have individual ridges 40 separated by grooves or channels 42. Moreover, and by reference to FIG. 3, it can be seen, in a preferred embodiment of the invention, that the ridges and channels are also located in rectangular arrays, such that there is a series of progressively smaller rectangular grooves and channels emanating at the frame and extending toward the center of the skins.

The undulating surface of the skins 38 effectively allows the skins to expand and contract. While the skins themselves do not have any substantial elasticity, and indeed, have a relatively low modulus of elasticity, the skins nevertheless permit expansion and contraction through the undulating surface. In effect, this undulating surface provides an accordion-type effect so that the channels 42 and the ridges 40 actually become spaced apart from one another by greater dimensions during the expansion of the skins. However, due to the fact that the skins are molded, they have sufficient elasticity to return to their original shape when no longer forced into an expanded condition.

The filter plate is also formed with a central opening 44 for entry of a slurry or sludge into individual cavities formed between the filter plates, as hereinafter described. The slurry which is to be filtered contains one or more solids and one or more liquids. As indicated previously, the one or more liquids may be retained and recycled for use in other processes. otherwise, the solids may be reclaimed and reused or, for that matter, both may be reclaimed and reused. In many cases, the slurry may consist entirely of waste products but which are filtered to allow the solids to be discarded in a compact fashion and which allows the liquids to be subjected to waste treatment processes.

In order to permit drainage of the liquid separated from the solids, each filter plate is provided with shallow depressions 46 in the nature of drainage depressions. Moreover, each of these drainage depressions 46 communicate with diagonally located drainage channels 48 which are, in turn, connected to drainage openings 50 in the frame 36. Each of these drainage openings 50 are connected to the individual tubes 30 and for delivery of the separated liquids along the delivery duct 32. For this purpose, each drainage opening 50 may open on the side of the frame and may also be provided with a fitting (not shown) for connection to a discharge tube 30.

Figure 5:
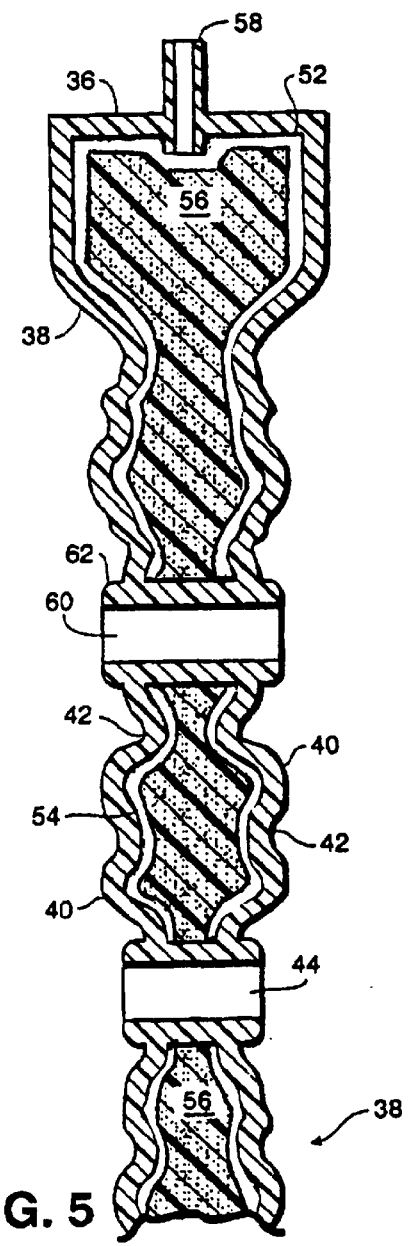
FIG. 5 is an enlarged fragmentary vertical sectional view, somewhat similar to FIG. 4, and showing the expansion of the skins forming part of a filter plate.

The filter plate 20 is hollow, as previously described and as best shown in FIGS. 4 and 5 of the drawings. Thus, the peripherally extending frame has an inner peripheral space 52 and the skins 38 have an internal space 54 in communication therewith. These entire spaces 52 and 54 are filled with a plastic foam core material such as, for example, a polyurethane foam 56. However" the space 52 and the communicating space 54 between the skins 38 is all sealed, since the entire frame itself remains effectively sealed. Thus, an expanding fluid can be introduced into the foam core 56 causing expansion of the skins from the position, as shown in FIG. 4, to the expanded condition, as shown in FIG. 5. This feature aids in filter efficiency, as hereinafter described.

In order to introduce an expanding fluid into the foam core 56, the frame 36 is provided with one or more fittings 58. These fittings are designed for connection to a source of an expanding fluid for introduction into the foam core 56. In this respect, the term "expanding fluid" refers to a fluid which will cause expanding of the skins 38 and does not necessarily refer to the fact that the fluid itself is expandable or contractable. In many cases, the expanding fluid could be a hydraulic fluid, although in a more preferred embodiment, for ease and cost control, air under pressure serves as an excellent expanding fluid.

Each filter plate is also provided with one or more filter screen-receiving openings 60. In the embodiment of the invention, as shown in FIGS. 2–4, four rectangularly arranged filter receiving openings 60 are provided and each opening is surrounded by a rectangularly shaped step 62. Thus, in the embodiment, as shown, the filter plate 20 would be provided with four individual filter screens, as hereinafter described in more detail. The actual attachment of the filter screen to the filter plate is also hereinafter described in more detail. However, it should be understood that one single filter screen could be located on the exterior side of each of the skins and mounted through the feed opening 44.

Figure 6:
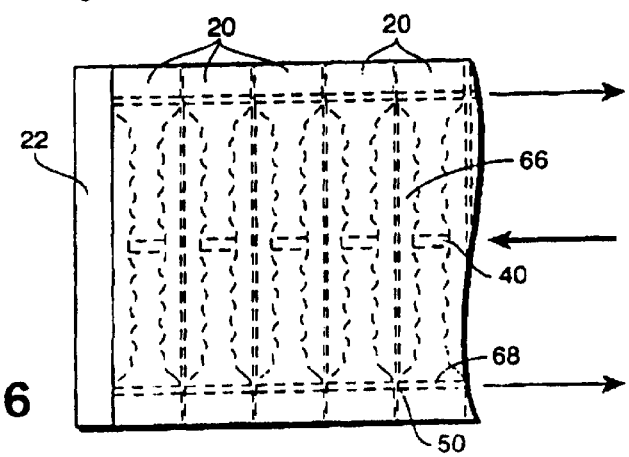
FIG. 6 is a fragmentary schematic side elevational view showing the operation of a plurality of filter plates constructed in accordance with the present invention and in a filter press arrangement.
Figure 11:
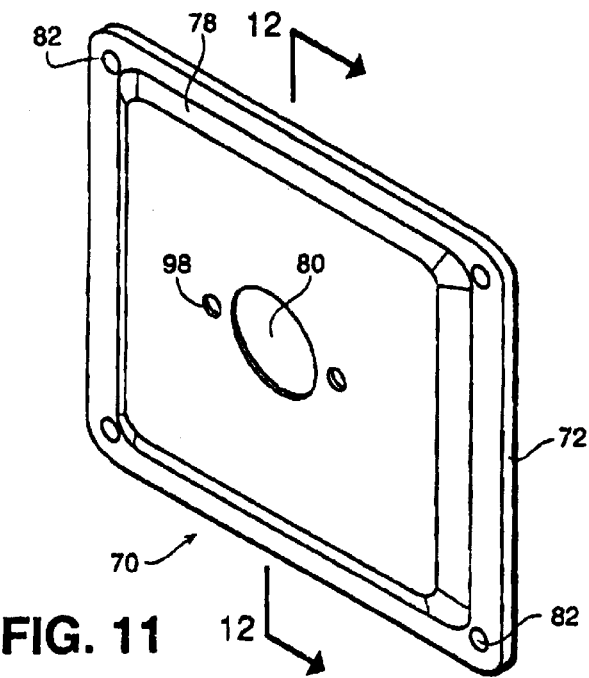
FIG. 11 is a perspective view of a filter screen constructed in accordance with and embodying the present invention.

Each of the individual filter plates 20 have the skins recessed inwardly with respect to the sides of the frame, as best shown in FIGS. 2 and 4 of the drawings. In effect, there is an enlarged recess existing between the exterior face of the skin and the sides of the peripheral frame 36. When a plurality of like filter plates are connected together, as best shown in FIG. 6 of the drawings, these individual recesses form liquid-receiving cavities 66. In the embodiment as shown in FIG. 6, the slurry feed inlet opening 44 is located at the center of each of the filter plates. This slurry feed opening extends, in effect, through each of the individual filter plates and is in communication with the cavity formed by the spaced-apart and opposed recesses on each of a pair of connected filter plates 20. It can also be seen, in accordance with the arrangement as shown in FIG. 6 that drainage openings 50 communicate with a common drainage duct 68 formed in each of the individual filter plates and which would in turn, lead to a single drainage tube 30 and the discharge duct 32.

By further reference to FIG. 6, it can also be seen that each of the individual filter plates 20 carry filter screens, as also hereinafter described in more detail. These filter screens are also constructed to permit delivery, e.g., pumping of the liquid and solid containing slurry into the individual cavities 66. During the separation process, the liquid is allowed to seep through the filter screen into the recess associated with each individual filter plate and into the drainage duct 68. The solids, on the other hand, will remain as a cake on the exterior surface of each of the filter screens, as hereinafter described.

One of the unique aspects of the filter plate, as heretofore described, is the fact that it can be formed of a moldable plastic. This permits heat transfer to take place, both easily and inexpensively and moreover, on an efficient heat transfer basis. In many cases, it is desirable, if not necessary, to maintain the slurry at a certain temperature in order to maintain one of the components of the slurry in a desired condition for further processing or otherwise, to facilitate liquid-solid separation.

Due to the fact that the skins are very tightly adhered to and are indeed preferably integral with the frame, there is little risk of "blowing" the skins, that is causing a separation of the skins from the frame. Moreover, due to the fact that all components are formed of the same plastic material, heat transfer can be easily effectuated by introducing a fluid into the solid core which will readily and quickly either heat or cool the slurry which is being separated. Furthermore, electric probe heaters may also be inserted into the core in order to effectuate heat transfer.

In the case of the conventional diaphragm type filter plate, heat transfer was very inefficient and not easily controllable, due to the fact that the diaphragm plates are formed of elastomeric materials. However, the filter plates of the present invention do not suffer these disadvantages. Indeed, the filter plates can be constructed as a unitary structure in a conventional molding operation and therefore, not only are the filter plates more efficient, but they are far less expensive to produce. In addition, the inherent risk of destroying the filter plate by causing expansion when not in a press arrangement is also avoided.

The fact that the filter plates are also constructed of a relatively inert and fully polymerized plastic material enables a chemical resistivity which is sometimes not available with many elastomers. Furthermore, and due to the fact that temperature control can be maintained, it is also possible to impose a vacuum on the slurry introduced in the cavities between the filter plates in order to thereby further effectuate liquid-solid separation. When the slurry is placed under strong vacuum, it is possible to reduce the temperature in order to effectuate liquid-solid separation. Imposing of a vacuum also permits drying the cake much more quickly. As the cake dries, the cake forms as a solid structure and does not flake, as such.

Due to the fact that the plate skins are undulating and even preferably, have a somewhat serpentine shape, drainage area is substantially increased. Moreover, filtration surface is further increased by as much as 40%. The filter plates can also be constructed in a variety of sizes and shapes. Thus, for example, the filter plate could be constructed in a relatively small size for use in laboratory environments to sizes ranging to a very large filter plate used in large industrial operations.

FIGS. 7–12 of the drawings more fully illustrate a preferred embodiment of a filter screen device forming part of the present invention and which may be used with the filter plates heretofore described. The filter screen device 70 comprises an individual screen frame or screen base 72. By reference to FIGS. 7, 8 and 11 of the drawings, it can be seen that the screen frame 72 is rectangularly shaped and would otherwise be formed with a central opening existing between the peripherally extending rectangularly shaped screen frame 72. However, a filter cloth or so-called "filter screen" 74 is incorporated in that existing initially opened space.

The filter screen 74 is actually formed of any of those materials used as filter screens in prior art devices. Thus, any cloth which is relatively chemically inert and capable of permitting separation of liquids from a solid by permitting passage of the liquid and collection of the solid as a cake, can be used. These devices typically will employ a filter cloth which is frequently referred to in the art as a "filter screen." Therefore, the term "filter screen" is used in a broad sense to encompass any type of filter material, whether referred to as a gauze, cloth or screen.

Figure 12:
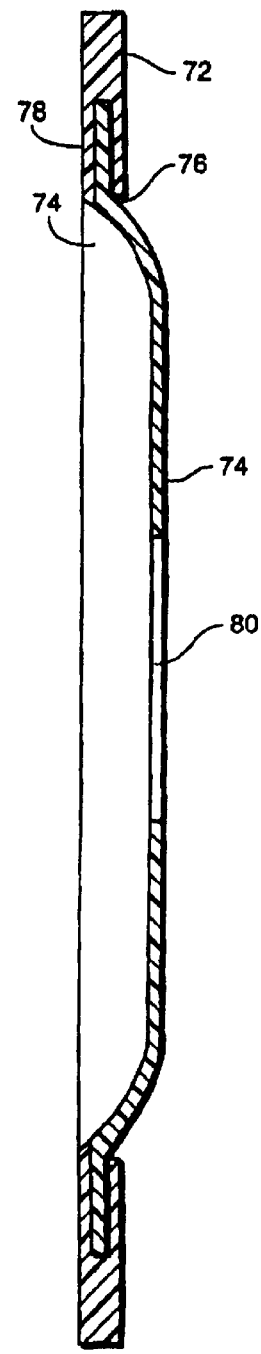
FIG. 12 is a vertical sectional view taken along line 12—12 of FIG. 11.

The filter screen frame 72 is preferably, although not necessarily, formed of an elastomeric material. Thus, and to some extent, the filter screen frame 72 will have some resiliency and elasticity. The filter screen 74 is actually molded into the filter screen frame 72, so as to form a unitary structure. In this case, the filter screen 74 thereby becomes effectively integral into the filter screen frame 72. FIG. 12 illustrates the filter screen or cloth 74 molded as an integral structure into the filter screen frame 72. It can be seen that the filter screen frame 72 is provided with inner peripherally extending flanges 76 and 78 which are, in effect, molded to one another directly through the pores of the filter screen or cloth 74. Thus, the filter screen 74 actually becomes an integral part of the filter screen device 70.

The filter screen 74 is also provided with a central opening 80 capable of being aligned with the feed opening 44 in the filter plate. This will allow feed slurry to be passed through the filter screen 74 to the exterior side thereof and will allow the liquid to separate from the solids directly through the pores of the screen 74. Each filter screen frame 72 is also provided with drainage openings 82 which are alienable with and in communication with the drainage openings 50 in the respective filter plates.

The fact that the filter screen 74 is molded into the frame 72 enables a relatively trouble-free operation. Moreover, this type of filter screen device is much easier to clean than a conventional O-ring type filter. This type of filter screen device 70 allows solids to be retained by the filter screen 74 in operation and as more solids are pumped into the cavities, liquid is displaced through the filter screen 70 and cakes are formed. When all cavities have been filled with the cake, the assembly is opened and the cakes are removed from each individual plate. After the cake has been removed, the same filter screen can be reused with the plates pressed back together and the entire press closed to repeat the cycle.

Each filter screen 70 is retained on an individual filter plate 20 by means of a retaining adapter 86 which is more fully illustrated in FIGS. 9 and 10 of the drawings. In the embodiment of the invention as shown, the retaining adapter 86 is provided with a cylindrically shaped retaining flange 88 having a size larger than the feed opening So of the filter screen and is adapted to overly a portion of the filter screen 74 to retentively hold the filter device 70 onto the filter plate 20. The retaining flange 88 is integrally provided with a cylindrically shaped hub 90 having a central opening 92 in order to allow the feed slurry to pass through the aligned feed aperture 80 in the filter screen 74 and into the feed aperture 74 in the filter plate 20. This will allow the individual introduced feed slurry streams to be introduced into the individual cavities 66.

The adapters 86 are provided on the exterior face with their enlarged fastener-receiving bosses 94 having fastener-receiving openings 96. This will allow receipt of a mechanical fastener such as screws or the like for securement of two retaining adapters 86 on each of the opposite sides of the filter plate, as best shown in FIGS. 8 and 9 of the drawings.

The retaining adapter 86 is preferably formed in a plastic molding operation and may also be formed of any of those plastics used in the formation of the filter plate 36. The hubs 90 of the adapters 86 are sized to be received in the individual feed apertures, such as the feed aperture So and the feed aperture 44. However, and again, when recognizing that the plates can be constructed of various sizes, the hubs 90 and hence the feed openings 92 of the retaining adapters would be constructed with the appropriate size.

Figure 13:
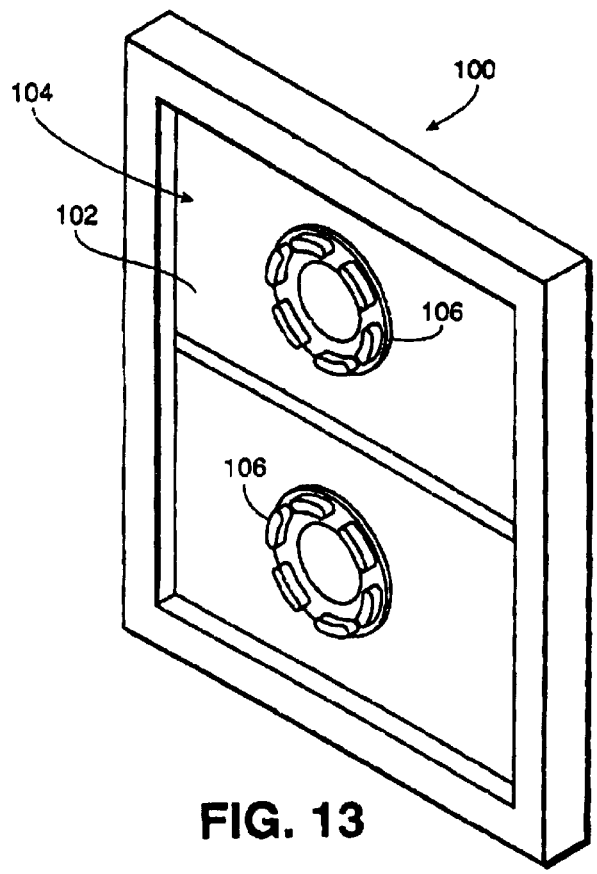
FIG. 13 is a perspective view of a modified form of filter plate construction in accordance with the present invention.

Each of the filter screens are also provided on the filter screen 74 with fastener-receiving openings 98. In this way, these fastener receiving openings 98 are alienable with the fastener receiving openings 96 in the bosses 94 to receive the individual fasteners. FIG. 13 illustrates an embodiment of a filter plate 100 having a pair of feed openings 102. In this case, an individual filter assembly 104, substantially similar to the filter assembly 70, is located on the filter plate and a second filter screen or filter assembly 106 covers the remainder of the first side of the filter plate. A pair of like filter assemblies are on the opposite side of the filter plate. Each filter screen assembly has an adapter which fits in a feed aperture of the filter plate and the screens on each side of the plates substantially cover the exposed surface area of the individual skins of the filter plate. Each filter screen assembly 104 is provided with a retaining adapter 108, substantially similar in construction to the retaining adapter 86. In accordance with the construction as shown in FIG. 13, it is therefore possible to use a pair of filter screens with a pair of simultaneously operating feed inlets.

The filter screen assembly of the present invention allows the filter screen to be not only reusable, as aforesaid, but also allows the filter screen to be readily and easily cleaned. It has a much greater structural integrity than does a typical filter cloth which is frequently discarded after use. The filter screen assembly of the present invention also has considerably greater durability and much more structural integrity than does a standard filter cloth. Moreover, the fact that the filter screen assemblies can be effectively clamped at the feed inlets without having to extend through the feed inlets, allows a plurality of inlets in each individual filter plate. This was not effectively possible on an efficient basis with prior art filter plate and filter screen constructions.

The filter screen assembly of the invention is therefore far more efficient and effective then the prior art so-called "weep cloth." In effect, there is a one-piece gasket type arrangement which is obtained with the filter screen assembly of the invention. Further, it is not necessarily to sew or secure two cloths together so as to have a separate cloth on each side of the filter plate. Further, it is not necessary to effectively thread the filter cloth through the filter plate.

Two Piece Frame Embodiment

The invention is now discussed with reference to FIGS. 14–36. General teaching of the manner of forming and using a filter cloth embedded in rubber gasketing material is generally known from the other specific examples above.

Figure 14:
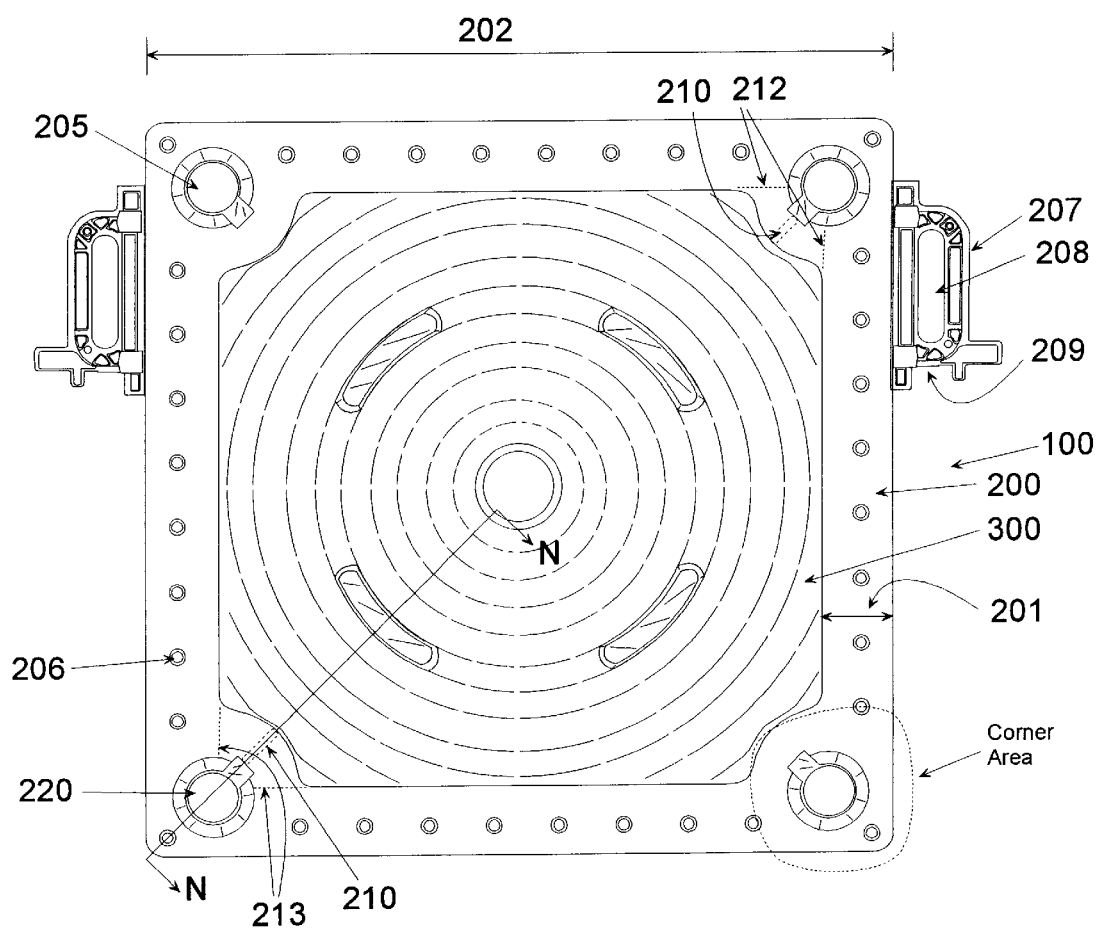
FIG. 14 is a top view of the improved two piece frame embodiment of the present invention. One side of the frame and one of two opposing diaphragm pieces are seen, whereon the frame outer edge is equipped with integral dual purpose filter press support and lifting handles.

FIG. 14 shows filter plate 100 comprising frame piece 200 and diaphragm piece 300. Not shown but used with these pieces are an appropriate filter cloth 600 as later shown and described.

Frame piece 200 is preferably injection molded of a polyolefin, fiber filled polyolefin or other such polymer with rigid strength as required to accomplish the objects of the present embodiment. It has been found that for all but a lowest pressure range of applications, the invention of the other embodiment of the present invention comprising a single rotomolded filter plate has insufficient compressive strength along the frame section to prevent increasing compressing collapse. The present embodiment reflects the experience of the inventor to provide a rigid instead of flexible frame to prevent collapse and leakage of process fluid. Frame piece 200 comprises a planar rectangular shape with a flat outer face with a width 201 of about 2.5 to 6 inches and an outer edge length 202 of from about 1.0 to 5 feet. Each frame piece has a thickness 203, as in FIG. 25 of from about 0.75 to 3 inches. Each corner of piece 200 has a greater width than width 201 for accommodation of means for accomplishing the dual functions of diaphragm fluid inlet/outlet or process fluid drainage from between the filter cloth and the diaphragm piece. Each corner of piece 200 is provided with a drainage fluid conduit hole 205, alignment of which with adjacent filter plates creates a conduit for flow of process fluid or, in the case of diaphragm inflation fluid hole 220, diaphragm inflation or heat transfer fluid. The width of the frame piece 200 at the corner sections is diagonally about 3 to 10 inches from the outer edge of the corner section of piece 200.

Bolt holes 206 are provided at about every 3–6 inches along piece 200 such that bolts or screws may connect two mirror image pieces 200 when aligned as described below. Optionally, piece 200 is provided with an integral support/lift handle 207 defining a hand hole 208 and filter plate support surface 209 permitting easy handling and alignment on the filter press to which the filter plate will be placed.

In FIG. 14, broken lines show the footprint of a process fluid drainage cutout 212 and a center flow support lug 210 disposed generally within that cutout to compress the diaphragm pieces between such a lug 210 and another lug 210 on opposing frame piece. Another such center flow lug is disposed within a identical inflation fluid cutout 213, shown in broken lines as well.

Figure 15:
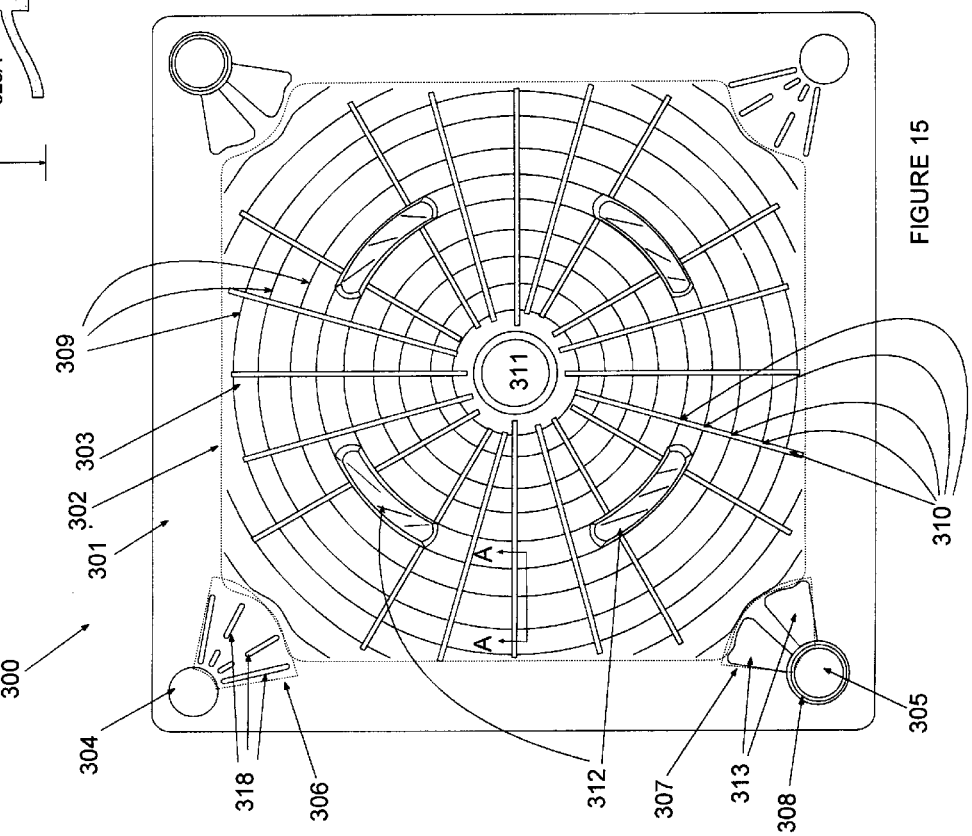
FIG. 15 is a top view of one of the mirror-image wave configuration diaphragm pieces of the embodiment of FIG. 14, comprising two diagonal corners adapted for providing diaphragm fluid inflation ports and the other two diagonal corners adapted for providing drainage ports from between the filter cloth and the diaphragm piece.

The outer face of diaphragm piece 300 is shown in part in FIG. 14 and fully in FIG. 15. Piece 300 is divided between (1) an inactive area 301 lying generally between the outer edge of piece 300 and the broken line outline 302 of opposing pieces 200 and (2) an active area 303 whereabove filtration and diaphragm inflation and deflation take place. Except for the described exceptions, area 301 is flat with respect to surfaces opposing the inner face of piece 200 on the outer face of area 301 and the inner face of an adjacent diaphragm piece on the inner face of area 301. Each of the corner sections of piece 301 is adapted to permit a specific function in conjunction with the frame and filter cloth. Drainage fluid hole 304 is designed to align with hole 205 and inflation fluid hole 305 is designed to align with hole 220. The outer edge dimensions of piece 300 are about the same as those of piece 200. The drainage fluid zone 306 is designed to align within the cutout 212. Certain elements are disposed within those zones 306 and 307, as well as port sealing means 308, whereby such elements are generally the only raised elements on the area 301 on the outer face. There are no raised elements on the opposite, inner face of area 301.

Active area 303 generally comprises a concentric set of annularly disposed crests 309 and troughs therebetween forming a wave or undulating pattern in diagonal cross section of piece 300, the crests and troughs broken at flattened zones 310 to permit drainage of fluids between the concentric crests and troughs toward one of the drainage fluid zones 306 from the process fluid inlet hole 311. Also generally disposed along a crest about midway from the hole 311 and line 302 are four raised sections 312, with a raised flattened surface of about 1–3 inches wide and at least about 2 inches in arc length. The flattened surface of section 312 comprises a height above the crests of about 0.2 to about 2 or more inches, thereby providing an opposing support surface against which an adjacent filter plate will abut with a matching raised surface, with the two filter cloths intervening and such filter cloths having preferably rubber sections plated along the interface. These raised sections 312 preferably form a void on the inner face as the crests 309 of the outer face shown in FIG. 15 are troughs when piece 300 is viewed on the inner face. Raised sections 312 form a critical portion of this embodiment for generally larger filter plate sizes, as the one shown and described for the present embodiment.

A broken away corner for a diaphragm inflation fluid port and sealing means is shown in FIGS. 17–22. The overall thickness of piece 300 is generally uniform within the range of about from 1.5 to 8 millimeters, with a most preferable range of from about 2 to 4 millimeters. Referring to FIG. 17, two separated port flow sections 313 are shown raised above the outer face of the generally flat surface of area 301 to form a void 315 as to the inner face view as shown in FIG. 18. Void 315 has disposed within it a port dividing lug 316, whereby a slotted port is made through the wall of means 308 into the hole 305 defined by the inner means wall 317. The effect of placing the inner faces of two diaphragm pieces 300A and 300B alignedly together, as in FIG. 22, creates a set of four flow ports 314 through which may flow in or out diaphragm inflation or heat transfer fluid from (1) the conduit created by the surfaces defining holes 305 and 220 after filter plate alignment on a filter press to (2) the space between the inner faces of diaphragm pieces 300A and 3008. An optional sealing material is shown in FIG. 22 as between the inner faces of diaphragm pieces 300A and 300B, such sealing material having adhesive on both sides and preferably applied to the entire inner faces of the diaphragm pieces 300A and 300B in the inactive areas 301A and 301B. Sealing means 308 generally comprises a raised solid section adapted to insert into an adapted portion of hole 220 whereby fluid used to inflate, deflate, or cause heat transfer to the diaphragm cannot leak to the process side of the filter plate in operation. Gasket sealing surface 314 is the surface providing a pressure seal of a circular rubber or elastomer gasket between surface 314 and an adjacent surface within hole 220.

With reference to FIG. 15, zone 306 is flat as the general flat surface of area 301 with the exceptions of drainage zone support lugs 318, having about the same height (about 2–5 millimeters) as the raised portion of inflation fluid zone 307 and adapted to opposed the inner face of the cutouts 212 of piece 200, thereby to urge together the inner faces of opposing diaphragm pieces 300A and 300B in the zone 306 to prevent leakage of diaphragm inflation fluid from the interdiaphragm space into the process side of the filter plate.

Figure 16:
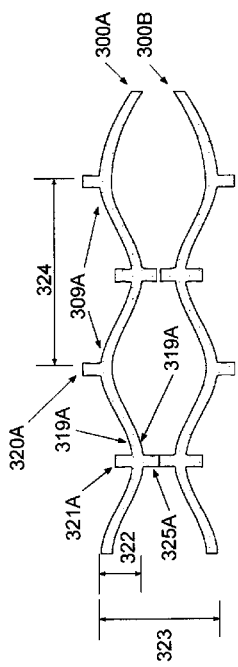
FIG. 16 is a cross section AA of FIG. 15 whereby two opposing diaphragm pieces with lugs are shown.

In FIG. 16, cross section AA in active area 303 is shown for opposing diaphragm pieces 300A and 300B as they would be oriented in an assembled filter plate according to the present embodiment. It is understood that diaphragm pieces 300A and 300B are mirror images of each other, i.e., require only one mold to form both by injection molding techniques, albeit the two pieces are arranged so as to have their inner faces opposing one another without intervening structure. Thus, the discussion for piece 300A also applies equally to 300B where appropriate. Crests 309A have extending from them about normal to their topmost curve on the outer face crest lugs 320A. Troughs 319A have extending from them trough lugs 321A similar in shape and dimension to lugs 320A. Lugs 320A and 321A are about located roughly equally spaced along the crests and troughs of the active area 303 with uniform heights within the range of from 2–10 millimeters, uniform thicknesses within the range of from about 2–5 millimeters and a selection of arc lengths along the crests or troughs of from about 5–20 millimeters, having arc separations between them of about 5–50 millimeters to permit free drainage of liquids to the drainage zone 306 and therefrom to hole 304. The crest to trough height 322 is, including the piece 300A thickness, is uniform across the piece 300A and within the range of from about 5–25 millimeters but more preferably within the range of from about 10–15 millimeters. A crest to crest height 323 between assembled pieces 300A and 300B is uniform across the assemble and within the range of from about 15–60 millimeters, but is more preferably within the range 20–30 millimeters. Crest to crest distance 324 is uniform across piece 300A and within the range 20–50 millimeters, but is more preferably within the range 25–35 millimeters.

On the inner face of troughs 319A of piece 300A (i.e., the crests of the inner face), are set separation lugs 325A with about the same length and width as lugs 320A, although of uniform height in a range from about 2–10 millimeters and are arranged to as to directly oppose lugs arranged on piece 300B when the pieces 300A and 300B are assembled. This arrangement of lugs 325 permits maintenance of a generally parallel planar arrangement of the active areas of pieces 300A and 300B when assembled together and deflated.

Figure 23:
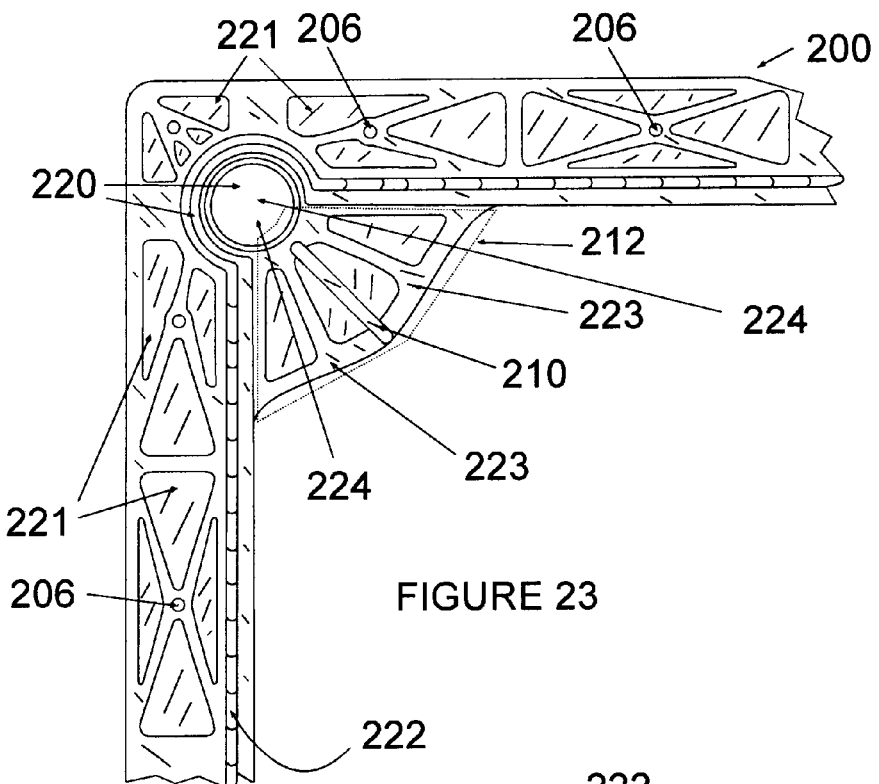
Figure 30:
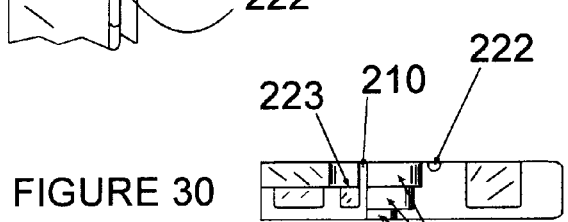
Figure 29:
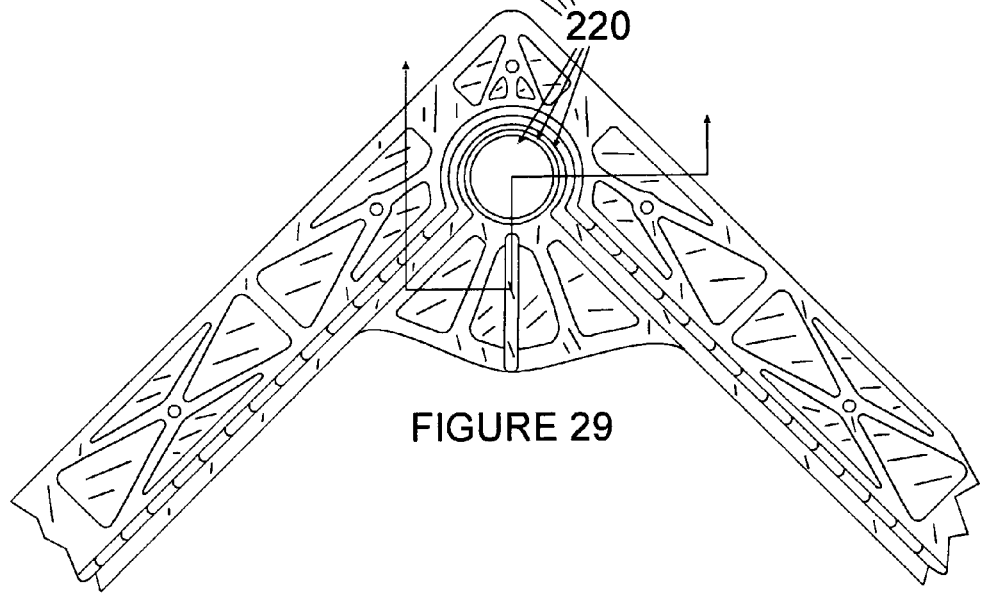

Frame piece 200 is now more fully described with reference to FIGS. 23–30. Piece 200 comprises a rigid frame with substantial voids and cavities 221 on the inner face, as shown in FIG. 23. However where holes 205, 206, and 220 pass through the frame, substantial defining thickness are applied support those holes from the inner to outer face of piece 200. The minimum polymer thickness required between any of the voids, holes or faces of piece 200 is about 5 millimeters. Void size is maximized to reduce weight and cost, although weight is reduced with the present specific example to about 30–60% of the weight of a solid frame with same functionality. Gasket groove 222 is formed into a portion of the inner face of piece 200 extending solidly from the inner to outer face. Groove 222 is continuous about the inner face of piece 200 between the outer edge of piece 200 and holes 205 and 220 and therebetween along the inner face of piece 200. This continuous groove forms a seat for a continuous cylindrical rubber gasket, the impression of which on the inactive area 301 of piece 300 forms an effective fluid tight seal against leakage of the process fluids from the filter plate in operation.

The corner structure of FIGS. 23–30 is identical for the holes 205 and 220, the function of which holes are determined by the impression of a portion of the inactive area 301 to the hole area, including the zones 306 and 307. Drainage cutout 212 is made into the inner face of piece 200 to an inner cutout face 223 so that the thickness of the frame is somewhat less than thickness 203 by about 2–10 millimeters. Lug 210 extends inward from inner cutout face 223 to the same height as thickness 203 so as to provide compressive sealing of the diaphragm pieces when assembled with another frame piece having the diaphragm pieces intervene between two opposing lugs 210. Drainage flows 224 are shown to illustrate the drainage flows of process liquid during operation of a filter press with the filter plates of the present embodiment.

Figure 31:
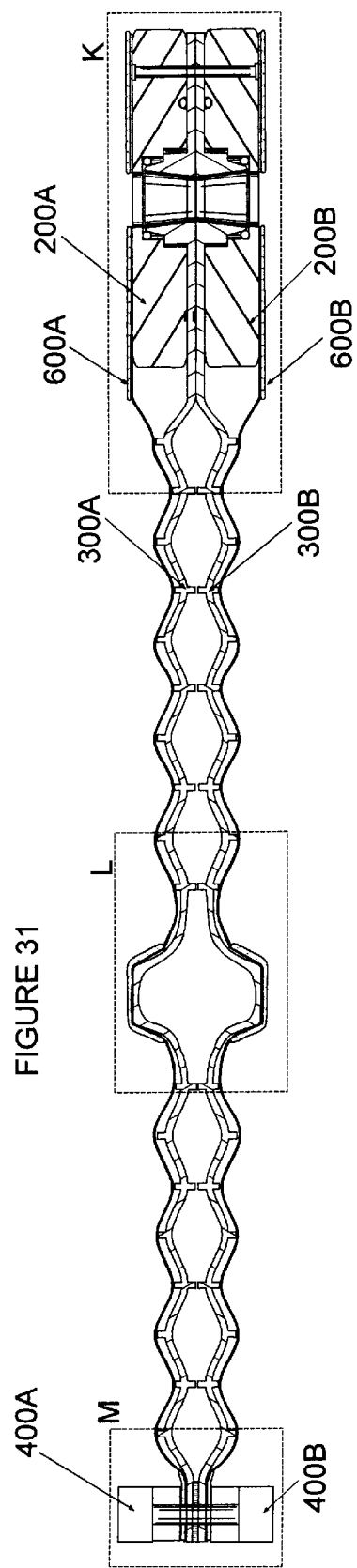
FIG. 31 is a cross section view NN of FIG. 14 (including filter cloths not shown in FIG. 14) of the fully assembled filter plate and filter cloth of the present invention.

FIG. 31 shows a fully assembled filter plate with frame pieces 200A,B, diaphragm pieces 300A,B, filter cloths 400A,B and feed hole sealing pieces 600A,B. The diagonal cross section shown is through a hole 220 adapted for inlet/outlet of inflation or heat transfer fluid to the space between the diaphragm pieces 300A,B. The appearance of a similar diagonal cross section for drainage hole 205 cross section for the assembled filter plate may be appreciated from the description above, such an appearance identical for frame pieces 200A,B but having drainage access to hole 205. Views K–M are shown respectively in FIGS. 32–34 in more detail. It will be appreciated that the A–B relationship of the items in this paragraph is one of all aspects of an A-item being mirror images of those aspects on the B-item, so that only the aspects of the A-item need be discussed for an appreciation of the structure of both items.

Figure 32:
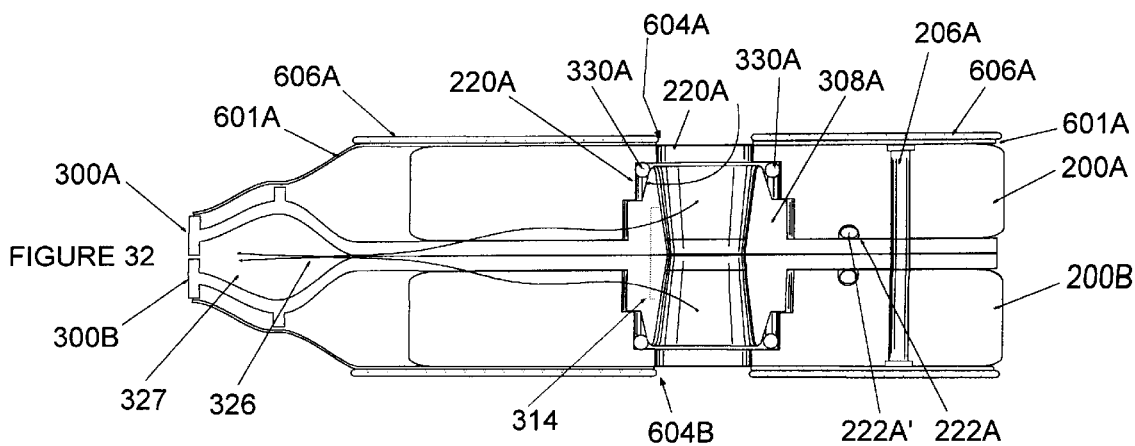

In FIG. 32, piece 200A has a stepped female hole 220A in relation to the male stepped raised means 308A, such that impression of means 308A to hole 220 causes surface 314 to press ring gasket (rubber or elastomer) against one of the steps of hole 220. This creates an effective seal against leakage of diaphragm inflation or heat transfer fluid to the process side of the filter plate in operation. It may be appreciated that the filter plate shown in FIG. 32 shows that the holes and cylindrical filter cloth holes 604A,B form a conduit which is further extended on alignment of other filter plates of this embodiment in a filter press, thereby forming a conduit through which may be fed at high pressure diaphragm inflation or heat transfer fluid to ports 314 along path 326 to a fluid tight diaphragm inflation cavity 327 between the inner faces of pieces 300A,B.

Further in FIG. 32, groove 222A has compressed within it continuous cylindrical seal 222A' by compression against piece 300A. Bolt hole 206A continues through the diaphragm pieces and other frame piece so that a single connecting bolt or screw can be inserted therein.

Filter cloth 600A is similar in function to the other filter cloths described herein, although the filter cloth portion 601A of this embodiment has the same approximate edge to edge dimensions as the frame pieces and melt-adheres substantial rubber or elastomer sections to some portions of the cloth portion 601A. Cloth portion 601A is assembled with the frame and diaphragm pieces so that its edges reach the outer edges of the frame pieces, thereby compressing between adjacent filter plates two filter cloths. In the interframe space is located holes 604A for holes 205 and 220 as well as an otherwise continuous covering of rubber or elastomer 606A melt-adhered into the cloth to form an inter-filter plate gasket sealing the process liquids in the filter press. Such melt adhered sections 605A of rubber or elastomer are applied at the area where the filter cloth will lie between the flattened, opposing portions of raised sections 312, as shown for raised section 312A in FIG. 33. This section 605A prevents wearing a hole in the cloth portion 601A. Raised section 312A preferably comprises a support rib 312A' extending from side to side of the length sides of section 312A where the raised section is greater than about 2–3 inches in length. The support rib provides additional resistance to compressive collapse of the raised section.

Figure 34:
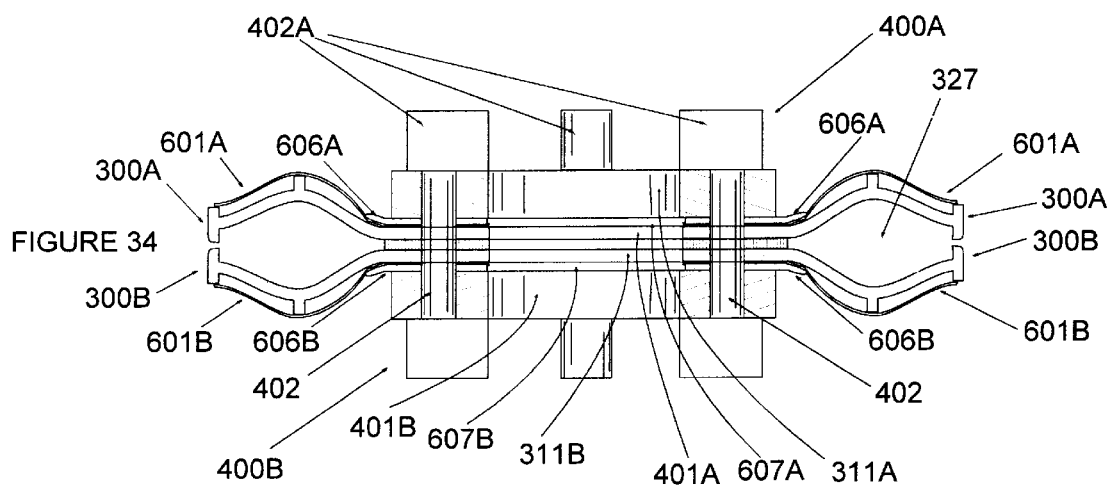
FIGS. 32–34 are enlarged views, respectively, of sections K–M of FIG. 31.
Figure 33:
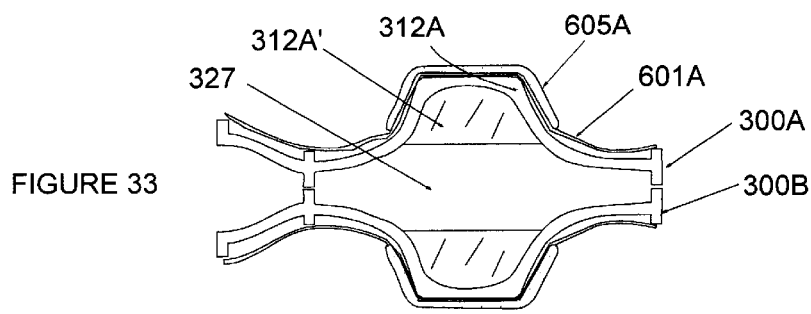

In FIG. 34, the process fluid inlet holes 311A,B are shown with the associated nearby portions of pieces 300A,B, filter cloths 600A,B, and compression sealing means 400 having opposing pieces 400A and 400B. Hole 311A is about 2–4 inches in diameter, similar to the dimensions of holes 205, 220, 304 and 305. The holes 311A,B are aligned with holes 607A,B in filter cloths 600A,B, which are in turn aligned with holes of pieces 400A,B respectively. Bolt holes are provided through all the solid layers as shown for compressive and sealing connection of piece 400A to piece 400B. Extensions 402A,B are provided for supportive separation of the fluid inlet holes of adjacent filter plates, as similarly shown and described in other embodiments herein. The filter cloth comprises an additional rubber section 606A,B between the pieces 400A,B respectively for gasketing seal of the slurry side of the process to the drainage filtrate side of the filter cloth.

Figure 35:
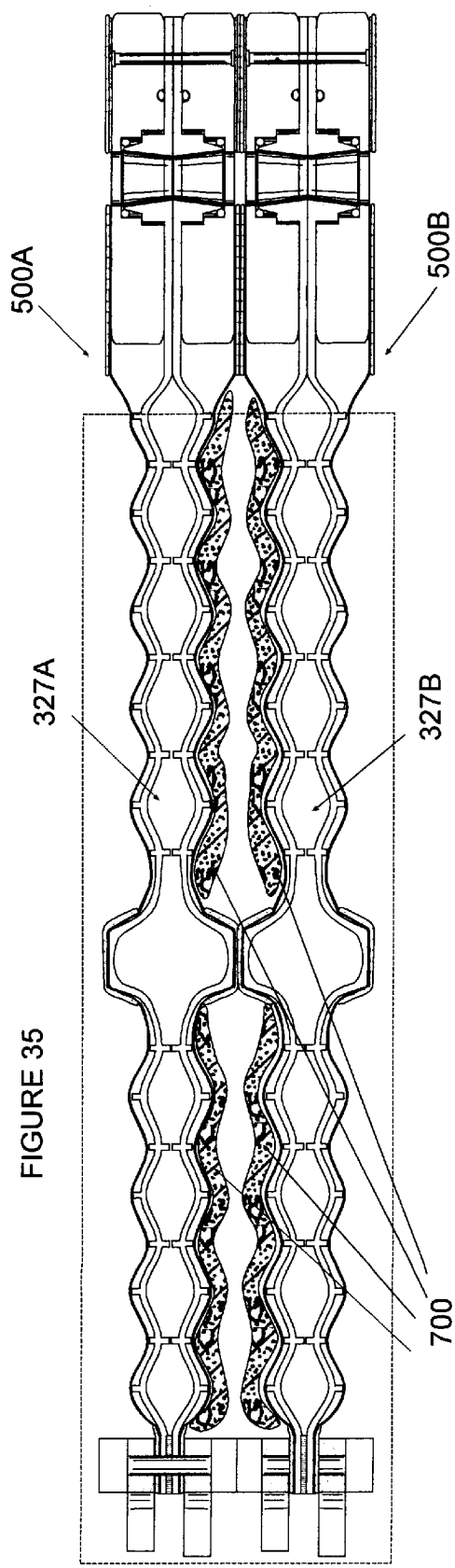
FIG. 35 shows adjacent filter plates as in FIG. 31 in opposing relationship as in operation in a filter press with a filter cake formed between the filter cloths of the adjacent filter plates.

FIG. 35 shows operation of the present filter plates with respect to the cross section shown in FIG. 31. Filter plate 500A is compressed in a filter press with adjacent filter plate 500B. Process feed slurry flows in through fluid inlet holes and the associated sealing structure, past extensions 402 to the space between the filter cloths as shown, wherein the slurry is drained somewhat of liquid, the liquid moving through the filter cloth to the space between the filter cloth and the outer face of the diaphragm pieces and therefrom to the drainage zones, ports and conduit, the action of which thereby renders an uncompressed filter cake 700 between the filter cloths.

Figure 36:
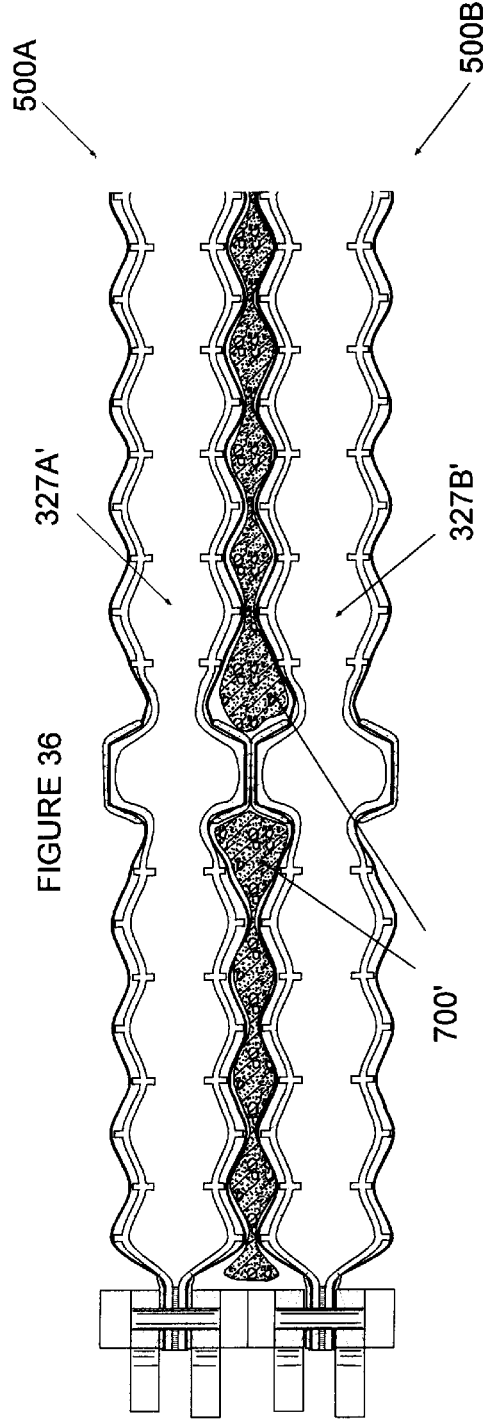
FIG. 36 shows the section M of FIG. 35 after operation of the adjacent filter plates to be inflated with fluid through diaphragm inlet/outlet ports and compressing the filter cake material shown in FIG. 35.

FIG. 36 shows the post inflation compression of filter cake 700' with the diaphragm of the present invention. Inflation liquid flows from the inflation fluid conduit through ports 314 into spaces 327A',B' to inflate substantially all the active area, albeit not the raised sections 312. Raised sections 312 abut one another in the uncompressed state in FIG. 35 and remain substantially unmoved by the inflation of the diaphragm pieces.

The above design disclosures present the skilled person with considerable and wide ranges from which to choose appropriate obvious modifications for the above examples. However, the objects of the present invention will still be obtained by the skilled person applying such design disclosures in an appropriate manner.

I claim:

1. A filter plate assembly having a two piece frame and a two piece diaphragm for filtration of slurries comprising:

(a) the two aligned and opposing frame pieces having adjacently disposed between them only two aligned and opposing diaphragm pieces without substantial other intervening structure between said diaphragm pieces and means for securing the two frame pieces together such that a liquid tight space is formed between the diaphragm pieces;

(b) each frame piece comprising:
  (i) a mirror image of the other and each having inner and outer faces and inside and outside edges such that when the frames' inner faces face one another, an intraframe space is defined therein between inside edges without intraframe supports other than the diaphragm pieces, and a frame perimeter is established with the outside edges;
  (ii) a width between the inside edges and the frame perimeter, such width further comprising at least two frame conduit holes extending from the inner to outer face, and each said frame conduit hole adapted to receive means for diaphragm inflation fluid sealing and further adapted to align with the frame conduit hole of the other frame when the frames' inner faces face one another, forming a set of aligned frame conduit holes;
  (iii) each said frame conduit hole having a drainage cutout from an edge of the frame conduit hole generally nearest the inside edge on the inner face and extending to the nearest inside edge on the inner face, such drainage cutout adapted to provide drainage of filtrate liquid through the drainage cutout to the frame conduit hole, the filtrate flowing from a space between a filter cloth and an outer face of a diaphragm piece to the drainage cutout; and (c) each diaphragm piece comprising:
  (i) a mirror image of the other and each having inner and outer faces and an outer edge such that when the inner faces abut one another, outer edges of the diaphragm piece form a diaphragm perimeter that is substantially the same size and shape as the frame perimeter;
  (ii) at least two diaphragm conduit holes extending from the inner to outer face, each such diaphragm conduit holes located so that each aligns with a diaphragm conduit hole of an opposing diaphragm piece and a set of aligned frame conduit holes when assembled as in (a);
  (iii) at least one diaphragm conduit hole having extended there about at the outer face means for diaphragm inflation fluid sealing adapted to insertably form a seal with a frame conduit hole such that for an assembly as in (a) a fluid tight seal is made between the diaphragm conduit hole and one of said frame conduit holes, said means providing one or more ports from the diaphragm conduit hole to the liquid tight space between the diaphragm pieces.

2. The assembly of claim 1 wherein:
(d) each diaphragm piece further comprises a central feed hole and central feed hole sealing means for maintaining the liquid tight seal between the diaphragm pieces; and
(e) a portion of the diaphragm pieces between the frame pieces is flat except for areas including said means for diaphragm inflation fluid sealing; and
(f) the a remaining portion of the diaphragm pieces being located in the intraframe space, such remaining portion defining an active area and is adapted to provide support for a respective said filter cloth.

3. The assembly of claim 2 wherein the active area is formed with a substantially undulating cross section shape having crests and troughs formed in the diaphragm outer face.

4. The assembly of claim 3 wherein the diaphragm outer face comprises outer face lugs of height less than about a crest to trough height of the cross section shape, such outer face lugs arranged substantially normal to a top point of the crests and a bottom point of the troughs.

5. The assembly of claim 4 wherein diaphragm inner face comprises inner face lugs of height less than about a crest to trough height of the cross section shape, such inner face lugs arranged substantially normal to a bottom point of the troughs of the diaphragm outer face and wherein the crests of the diaphragm outer face comprises a first raised section formed from and rising above the diaphragm outer face and adapted to oppose a second raised section of an adjacent assembly in a filter press operation.

6. The assembly of claim 5 wherein the undulating cross section shape of the diaphragm is adapted to be inflatable in the direction of the outer face such that a filter cake in a filter press operation may be compressed by inflation of the liquid tight space between the diaphragm pieces.

7. The assembly of claim 3 wherein diaphragm inner face comprises inner face lugs of a height less than about a crest to trough height of the cross section shape, such inner face lugs arranged substantially normal to a bottom point of the troughs of the diaphragm outer face.

8. The assembly of claim 3 wherein the diaphragm outer face comprises a first raised section formed from and rising above the crests of the diaphragm outer face and adapted to oppose a second raised section of an adjacent assembly in a filter press operation.

9. A filter plate assembly having a two piece frame and a two piece diaphragm for filtration of slurries comprising:
  (a) the two aligned and opposing frame pieces having adjacently disposed between them only two aligned and opposing diaphragm pieces without substantial other intervening structure between said diaphragm pieces and means for securing the two frame pieces together such that a liquid tight space is formed between the diaphragm pieces;
  (b) each frame piece comprising:
    (i) a mirror image of the other and each having inner and outer faces and inside and outside edges such that when the frames' inner faces face one another, an intraframe space is defined therein between inside edges without intraframe supports other than the diaphragm pieces, and a frame perimeter is established with the outside edges;
    (ii) a width between the inside edges and the frame perimeter, such width further comprising at least two frame conduit holes extending from the inner to outer face, and each said frame conduit hole adapted to receive means for diaphragm inflation fluid sealing and further adapted to align with the frame conduit hole of the other frame when the frames' inner faces face one another, forming a set of aligned frame conduit holes;
    (iii) each said frame conduit hole having a drainage cutout from an edge of the frame conduit hole generally nearest the inside edge on the inner face and extending to the nearest inside edge on the inner face, such drainage cutout adapted to provide drainage of filtrate liquid through the drainage cutout to the frame conduit hole, the filtrate flowing from a space between a filter cloth and an outer face of a diaphragm piece to the drainage cutout.

10. The assembly of claim 9 wherein:
(c) each diaphragm piece comprising:
  (i) a mirror image of the other and each having inner and outer faces and an outer edge such that when the inner faces abut one another, outer edges of the diaphragm piece form a diaphragm perimeter that is substantially the same size and shape as the frame perimeter;
  (ii) at least two diaphragm conduit holes extending from the inner to outer face, each such diaphragm conduit holes located so that each aligns with a diaphragm conduit hole of an opposing diaphragm piece and a set of aligned frame conduit holes when assembled as in (a);
  (iii) at least one diaphragm conduit hole having extended there about at the outer face means for diaphragm inflation fluid sealing adapted to insertably form a seal with a frame conduit hole such that for an assembly as in (a) a fluid tight seal is made between the diaphragm conduit hole and one of said frame conduit holes, said means providing one or more ports from the diaphragm conduit hole to the liquid tight space between the diaphragm pieces;
(d) each diaphragm piece further comprises a central feed hole and central feed hole sealing means for maintaining the liquid tight seal between the diaphragm pieces; and
(e) a portion of the diaphragm pieces between the frame pieces is flat except for areas including said means for diaphragm inflation fluid sealing; and
(f) a remaining portion of the diaphragm pieces being located in the intraframe space, such remaining portion defining an active area and is adapted to provide support for a respective filter cloth.

11. The assembly of claim 10 wherein the active area is formed with a substantially undulating cross section shape having crests and troughs formed in the diaphragm outer face.

12. The assembly of claim 11 wherein the diaphragm outer face comprises outer face lugs of height less than about a crest to trough height of the cross section shape, such outer face lugs arranged substantially normal to a top point of the crests and a bottom point of the troughs.

13. The assembly of claim 12 wherein diaphragm inner face comprises inner face lugs of a height less than about a crest to trough height of the cross section shape, such inner face lugs arranged substantially normal to a bottom point of the troughs of the diaphragm outer face.

14. The assembly of claim 13, wherein the diaphragm outer face comprises a first raised section formed from and rising above the crests of the diaphragm outer face and adapted to oppose a second raised section of an adjacent assembly in a filter press operation.

15. The assembly of claim 14 wherein the undulating cross section shape of the diaphragm is adapted to be inflatable in the direction of the outer face such that a filter cake in a filter press operation may be compressed by inflation of the liquid tight space between the diaphragm pieces.

* * * * *